United States Patent [19]

Saito

[11] Patent Number: 5,597,971

[45] Date of Patent: Jan. 28, 1997

[54] CHORD INFORMATION GENERATING APPARATUS AND CHORD INFORMATION GENERATING METHOD

[75] Inventor: Tsutomu Saito, Shizuoka-ken, Japan

[73] Assignee: Kabushiki Kaisha Kawai Gakki Seisakusho, Shizuoka-ken, Japan

[21] Appl. No.: 462,885

[22] Filed: Jun. 5, 1995

[30] Foreign Application Priority Data

Sep. 8, 1994 [JP] Japan .................................. 6-240514

[51] Int. Cl.⁶ .............................. G09B 15/00; G10H 1/38
[52] U.S. Cl. ........................ 84/669; 84/478; 84/DIG. 22
[58] Field of Search ...................... 84/613, 637, 650–652, 84/669, 715, 470 R, 477 R, 478, DIG. 22

[56] References Cited

U.S. PATENT DOCUMENTS 4,428,269   1/1984   Bione et al. ...................... 84/DIG. 22

Primary Examiner—Stanley J. Witkowski

[57] ABSTRACT

A chord information generating apparatus and a chord information generating method, for detecting a key depression state every time when keys in a specific key area are depressed, forming data which represents a skilled person or a beginner on the basis of the result of the above detection, sequentially accumulating the data in RAM, detecting the depression of one or two keys when the depression of keys in the specific key area is detected, and generating chord information for generating at least three chord tones when it is decided on the data accumulated in the RAM that the player is a beginner, or generating chord information for generating tones corresponding to the detected key-depression state when the above is not the case.

17 Claims, 14 Drawing Sheets

KEYBOARD CONTROL PROCESS ROUTINE

FIG. 1 BLOCK DIAGRAM OF AUTOMATIC ACCOMPANIMENT APPARATUS

MIDI-IN INTERRUPT ROUTINE

PANEL CONTROL PROCESS ROUTINE

MIDI-IN PROCESS ROUTINE

FIG. 8 PARTS 1-4 READING PROCESS ROUTINE

TIMER INTERRUPT PROCESS ROUTINE

*ACCOMPANIMENT NOTES PRODUCING PROCESS ROUTINE*

CONSTITUTION OF RECEIVING BUFFER

FIG. 14

CONSTITUTION OF REGISTER GROUP GR

\*: ON/OFF

| | | |
|---|---|---|
| BLOCK1 | * | KEY CODE |
| | 0 | VELOCITY |
| | 0 | REMAINING GATE TIME |
| BLOCK2 | * | KEY CODE |
| | 0 | VELOCITY |
| | 0 | REMAINING GATE TIME |
| BLOCK3 | * | KEY CODE |
| | 0 | VELOCITY |
| | 0 | REMAINING GATE TIME |
| BLOCK8 | * | KEY CODE |
| | 0 | VELOCITY |
| | 0 | REMAINING GATE TIME |

FIG. 15

CONSTITUTION OF PATTERN DATA

| |
|---|
| STEP TIME |
| NOTE NUMBER (KEY CODE) |
| GATE TIME |
| VELOCITY |

CHORD INFORMATION GENERATING APPARATUS AND CHORD INFORMATION GENERATING METHOD

BACKGROUND OF THE INVENTION AND RELATED ART

The present invention relates to a chord information generating apparatus and a chord information generating method for performing an automatic accompaniment with chords (hereinafter called "chord accompaniment").

One known automatic accompaniment apparatus generates accompaniment notes based on automatic accompaniment pattern data (hereinafter simply called "pattern data") previously stored in a memory and the key depression state on a keyboard instrument. This automatic accompaniment apparatus includes a chord information generating apparatus. The chord information generating apparatus comprises a chord discrimination portion for discriminating a chord consisting of a chord type and a chord root, and an accompaniment notes producing portion for preparing a plurality of accompaniment notes based on the results of the discrimination and based on the pattern data previously stored in the memory.

A keyboard type electronic musical instrument for which the automatic accompaniment apparatus of this type is adapted has, for example, an upper keyboard assigned for melodies and a lower keyboard assigned for chords. Therefore, a player can play a melody with the upper keyboard while generating chord accompaniment notes by designating chords with the lower keyboard.

Conventional automatic accompaniment apparatuses use several chord designating methods. In the first method, when three or more keys are pressed in a predetermined chord form, the chord information generating apparatus included in the automatic accompaniment apparatus discriminates a chord consisting of a chord root and a chord type based on the pressed keys, and then generates chord information based on this chord. Because this first method requires that a player should press three or more keys in accordance with the progress of music, it is difficult for beginners or inexperienced players. The first method is therefore mainly used by skilled players.

The second method designates a chord with one key or two keys, and is mainly used by beginners or inexperienced players. In the second method, when only one key is depressed, the note name of the depressed key directly becomes a chord root and the chord type becomes major (fixed). When two keys are depressed, the note name on, for example, the bass side key becomes a chord root and a chord type becomes minor when the keys are depressed in minor third and major when the keys are depressed in major third. Based on the chord root and the chord type, chord information for generating three or more chord tones is generated.

There is another known chord designating method for beginners, called "one-finger chord designation", which designates a chord with one key alone. In this method, a device called "touch bar" is used. According to this chord designation method, the note name of the depressed key becomes a chord root and a chord type is specified by the touch bar. Based on the chord root and the chord type, chord information for generating three or more chord tones is generated.

The chord designation method for beginners and the chord designation method for skilled players are prepared for most of the conventional automatic accompaniment apparatuses as mentioned above. The player previously specifies which chord designation method to use by operating a special device provided on an operation panel.

In general, beginners use one key or two keys to designate a chord, while skilled players use three or more keys to designate a chord. This suggests that it is possible to automatically determine whether the player is a beginner or a skilled person.

Beginners, who can depress just one or two keys only, demand that three or more chord tones be produced as tones from the lower keyboard by the depression of one or two keys. Skilled persons, on the other hand, desire that the tones of depressed keys (even if no chord is formed) be directly produced as tones from the lower keyboard.

OBJECT AND SUMMARY OF THE INVENTION

It is an objective of the present invention to provide a chord information generating apparatus and a chord information generating method in which the skillfulness of a player is automatically determined without being informed of whether the player is a beginner or a skilled person and chord information is generated according to the performance skill of the player.

To achieve this object, a chord information generating apparatus comprising key-depression detecting means for detecting a key-depression state, data producing means for producing data representing a skilled person or data representing a beginner in accordance with the key-depression state detected by the key-depression detecting means, data accumulating means for sequentially accumulating the data representing a skilled person and the data representing a beginner produced by the data producing means, skill-level determining means for determining the skill level of a player on the basis of a plurality of pieces of the data representing a skilled person and the data representing a beginner accumulated in the data accumulating means, and chord information generating means for generating chord information in accordance with the result from the skill-level determining means and on the basis of the key-depression state detected by the key-depression detecting means. The chord information comprises a key code which designates a pitch of a tone and may comprise a velocity.

The key-depression detecting means may be constituted of a central processing unit (hereinafter called "CPU"). This key-depression detecting means detects the key-depression state based on data from, for example, a keyboard instrument or externally supplied data (e.g., note-ON or note-OFF MIDI message). This key-depression detecting means may be designed to detect a key-depression in a specific key area assigned for designating a chord. In this case, a key area corresponding to the lower keyboard of, for example, a keyboard instrument may be used as the specific key area. It is possible to determine if, for example, a note-ON or note-OFF MIDI message belongs to the specific key area, based on a note number included in the MIDI message. Information corresponding to the key-depression state detected by the key-depression detecting means is supplied to the data producing means and the chord information generating means.

The data producing means may be constituted of, for example, the CPU. The data producing means produces the data representing a beginner, when the key-depression detecting means detects depression of one or two keys. When the key-depression detecting means detects depression of at least three keys, the data producing means checks whether or not a chord is formed, and then, produces the data representing a skilled person when it is determined that a chord is formed, or the data representing a beginner when it is determined that a chord is not formed. The data representing a skilled person and the data representing a beginner may be data consisting of, for example, one bit or one byte. In this case, the data representing a skilled person can be associated with "1", while the data representing a beginner can be associated with "0". The data representing a skilled person and the data representing a beginner produced by this data producing means is sequentially accumulated in the data accumulating means.

The data accumulating means in use may be a random access memory (RAM). More specifically, the data accumulating means may be constituted of a cyclic buffer or a shift register of a predetermined capacity formed in the RAM. The data representing a skilled person and the data representing a beginner is accumulated in this data accumulating means while the storage location is being changed sequentially. In other words, this data accumulating means is used as a recorder in which the data representing a skilled person and the data representing a beginner is stored piece by piece every time the player depresses one or more keys simultaneously. The data accumulating means is not limited to the RAM, but may take various forms of writable storage media such as a magnetic disk and a magneto-optical disk. Plural pieces of data accumulated in this data accumulating means are used to determine the skill level of the player.

The data accumulating means may be designed to hold the accumulated contents therein even when electric power is cut off. This is accomplished by constituting the data accumulating means by, for example, a nonvolatile memory element. If a volatile memory element is used as the data accumulating means, the data accumulating means may be designed to be backed up by battery power.

The chord information generating apparatus of the present invention may be constituted to further have clear means for forcibly clearing the accumulated content of the data accumulating means when electric power is turned on. The clear means may be constituted of, for example, the CPU. The clear means may be designed to clear the accumulated contents of the data accumulating means when electric power is given while a special operation is performed, e.g., while a specific switch on an operation panel or a specific key on the keyboard instrument is depressed, or both are operated.

The skill-level determining means may be constituted of, for example, the CPU. The skill-level determining means determines that the player is a skilled one when a ratio of the number of pieces of the data representing a skilled person accumulated in the data accumulating means, to the number of all pieces of the data accumulated in the data accumulating means, is equal to or greater than a predetermined value, or that the player is a beginner when the above ratio is less than the predetermined value. The predetermined value may be, for example, 0.5, but may take an arbitrary value. The data accumulating means may be designed so that the contents of the data accumulating means can all be initialized to "0" when, for example, electric power is turned on. In this case, at the point when an automatic accompaniment starts, the skill of the player is determined as that of a beginner. If the player depresses three or more keys and chords are formed by the depressed keys, however, the ratio is changed to consider the player as a skilled person.

The chord information generating means may comprise chord discriminating means and accompaniment notes producing means both of which may be constituted of, for example, the CPU. The chord discriminating means discriminates a chord consisting of a chord type and a chord root, on the basis of the key-depression state detected by the key-depression detecting means.

The accompaniment notes producing means produces the chord information for generating at least three chord tones on the basis of the chord discriminated by the chord discriminating means when the key-depression detecting means detects depression of one or two keys and when it is determined by the skill-level determining means that the player is a beginner, and the accompaniment notes producing means produces the chord information for generating tones corresponding to a key-depression state in a case other than the above. The "case other than the above" means a case in which it is determined by the skill-level determining means that the player is a skilled person or a case in which it is determined by the skill-level determining means that the player is a beginner and the depression of three or more keys is detected by the key-depression detecting means.

The chord information generating apparatus of the present invention may further comprise a chord type designating device for designating a chord type. In this case, when the key-depression detecting means detects depression of one key and when it is determined by the skill-level determining means that the player is a beginner, the chord discriminating means discriminates a chord consisting of a chord root corresponding to the key-depression state and a chord type designated by the chord type designating device, or discriminates a chord consisting of a chord root and a chord type on the basis of the key-depression state in a case other than the above. The "case other than the above" means a case in which it is determined by the skill-level determining means that the player is a skilled person or a case in which it is determined by the skill-level determining means that the player is a beginner and the depression of two or more keys is detected by the key-depression detecting means. When the number of depresses keys is equal to or greater than "2", a known chord discriminating method can be used, e.g., a method of sequentially comparing a previously prepared chord table with the key-depression state detected by the key-depression detecting means to thereby discriminate a chord.

The chord type designating device may comprise a first operating device for designating a chord type as minor and a second operating device for designating the chord type as seventh. As the first and second operating devices, touch bars provided at the key slip portion, for example, may be used. A minor chord is selected as a chord type in accordance with the manipulation of the first operating device, a seventh chord is selected as a chord type in accordance with the manipulation of the second operating device, and a major chord is selected as a chord when neither the first operating device nor second operating device is operated.

According to the chord information generating apparatus of the present invention, when the player executes a chord performance while sequentially depressing a key or keys, the skill of the player is determined and chord information is generated on the basis of the determination of the skill-level and the key-depression state. It is therefore unnecessary, unlike in the prior art, to designate whether a player is a beginner or a skilled person or to provide a particular device for this designation. When three or more keys are depressed, the key-depression state directly becomes the chord information regardless of a beginner or a skilled person, so that even the beginner, can execute a chord performance with special, intended chords.

A chord information generating method according to the present invention comprises the steps of (A) detecting a key-depression state, (B) producing data representing a skilled person or data representing a beginner in accordance with a result of the detection, (C) sequentially accumulating the produced data, (D) determining that a player is a skilled one when a ratio of the number of pieces of the accumulated data representing a skilled person to the number of all pieces of the accumulated data is equal to or greater than a predetermined value, or that the player is a beginner when the ratio is less than the predetermined value, and (E) generating chord information in accordance with a result of the determination and on the basis of the key-depression state.

In the step (A), the key-depression state may be detected based on data from a keyboard instrument or externally supplied data (e.g., note-ON or note-OFF MIDI message). A target key area for detection can be a special key area as in the above-described case of the chord information generating apparatus.

The step (B) may be designed in such a manner that when the depression of one or two keys is detect, the data representing a beginner is produced in step (B), and when the depression of at least three keys is detected, whether or not a chord is formed is checked in said step (B), and then, the data representing a skilled person is produced when it is determined that a chord is formed, or the data representing a beginner is produced when it is determined that a chord is not formed.

In the step (C), the produced data may be accumulated in a buffer such as a cyclic buffer (skill-level discriminating buffer) or a shift register. In this case, the data representing a skilled person and the data representing a beginner may be stored in the buffer while the storage location is being changed sequentially.

The predetermined value in the step (D) may be, for example, 0.5, but may take an arbitrary value. The cyclic buffer may be designed so that the contents of the buffer can all be initialized to "0" in, for example, an initial state. In this case, at the point when an automatic accompaniment starts, the skill of the player is determined as that of a beginner. If the player depresses three or more keys and chords are formed by the depressed keys, however, the ratio is changed. When the ratio becomes to be equal to or greater than the predetermined value, the player is determined as a skilled person.

The step (E) may include a step of discriminating a chord on the basis of the key-depression state, and in this case, the chord is discriminated on the basis of the key-depression state, and then, the chord information for generating at least three chord tones is generated on the basis of the discriminated chord when depression of one or two keys is detected and when it is determined that the player is a beginner, or the chord information for generating tones corresponding to the key-depression state is generated in a case other than the above. The "the case other than above" means a case in which it is determined that the player is a skilled person or a case in which it is determined the player is a beginner and the depression of three or more keys is detected.

Alternatively, the step (E) may include a step of discriminating a chord on the basis of the key-depression state, and in this case, when depression of one or two keys is detected and when it is determined that the player is a beginner, a chord is discriminated on the basis of the key-depression state and then the chord information for generating at least three chord tones is generated on the basis of the discriminated chord, and in a case other than above, the chord information for generating tones corresponding to the key-depression state is generated. The "case other than the above" means a case in which it is determined that the player is a skilled person or a case in which it is determined the player is a beginner and the depression of three or more keys is detected.

The step of discriminating a chord in the step (E) may include a step of designating a chord type, and in the step of discriminating a chord, when depression of one key is detected and when it is determined that the player is a beginner, a chord consisting of a chord root corresponding to the key-depression state and a designated chord type is discriminated, and in a case other than the above, a chord consisting of a chord root and a chord type is discriminated on the basis of the key-depression state. The "case other than the above" means a case in which it is determined that the player is a skilled person or a case in which it is determined that the player is a beginner and the depression of two or more keys is detected. When the number of depresses keys is equal to or greater than "2", a known chord discriminating method can be used as in the case of the above-described chord information generating apparatus.

The data accumulated in the step (C) may be held while electric power is cut off. Alternatively, the data accumulated in the step (C) may be cleared when electric power is turned on. The data accumulated may be cleared only when electric power is turned on while a special operation is performed, e.g., while a specific switch on the operation panel or a specific key on the keyboard instrument is depressed, or both are operated.

BRIEF DESCRIPTION OF THE DRAWINGS

FIG. 14 is a diagram showing the structure of registers used in this embodiment; and FIG. 15 is a diagram showing the structure of pattern data used in this embodiment.

DESCRIPTION OF THE PREFERRED EMBODIMENTS

An embodiment of a chord information generating apparatus and a chord information generating method of the present invention will now be described in detail with reference to the accompanying drawings.

Figure 1:
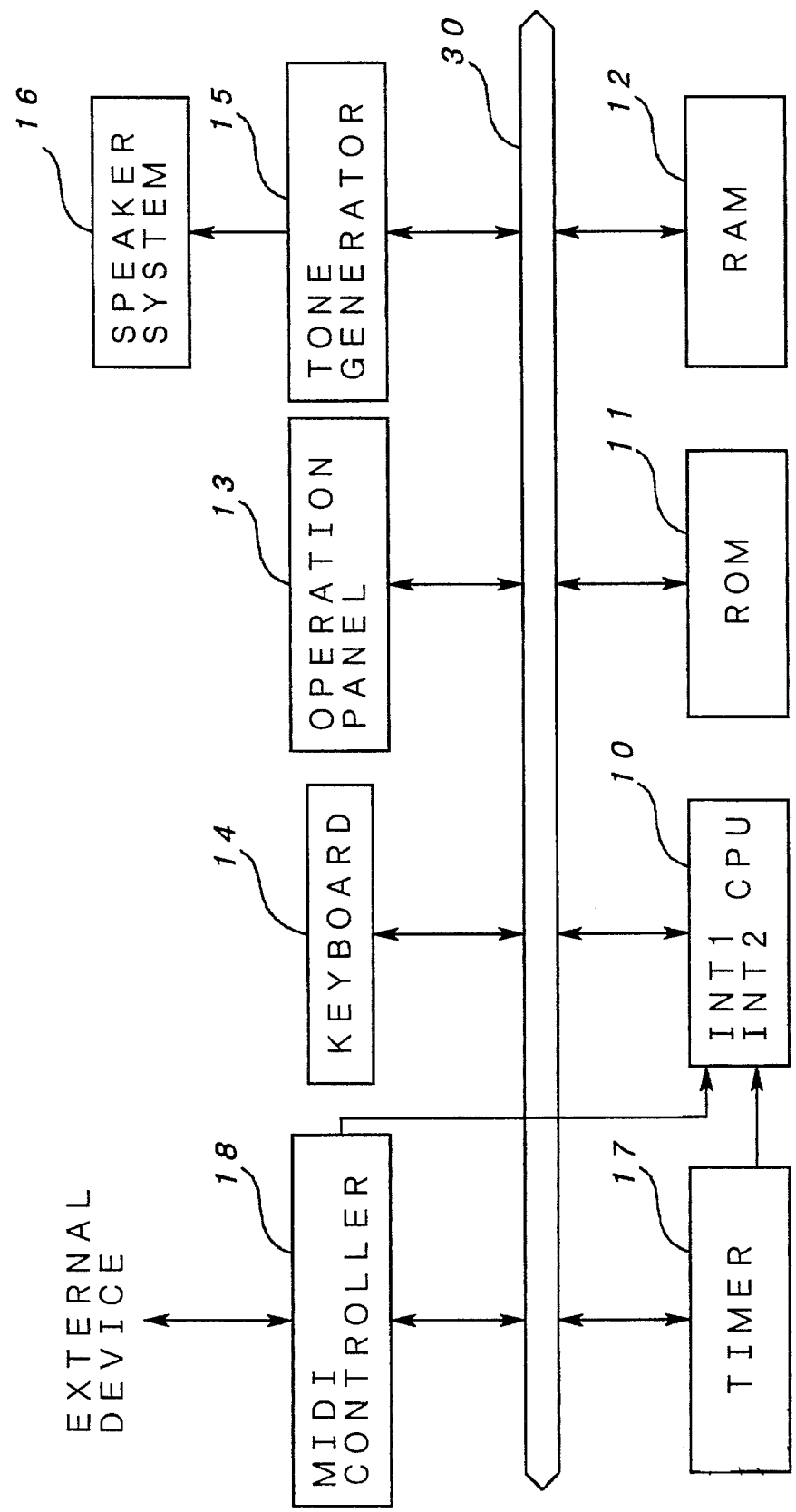
FIG. 1 is a block diagram illustrating the structure of an embodiment of an automatic accompaniment apparatus for which a chord information generating apparatus of the present invention is adapted.

FIG. 1 is a block diagram showing the structure of an embodiment of an automatic accompaniment apparatus for which a chord information generating apparatus of the present invention is adapted. The automatic accompaniment apparatus comprises a CPU 10, a read only memory (ROM) 11, a RAM 12, an operation panel 13, a keyboard instrument 14, a tone generator 15, a timer 17 and a MIDI controller 18, which are mutually connected by a system bus 30. The system bus 30 includes address lines, data lines and control signal lines, for example. This system bus 30 is used for the exchange of various kinds of data among the aforementioned components.

The CPU 10 performs general control of the automatic accompaniment apparatus in accordance with a control program stored in the ROM 11. This CPU 10 has input terminals INT1 and INT2. The input terminal INT1 is supplied with an interrupt signal from the MIDI controller 18 and the input terminal INT2 is supplied with an interrupt signal from the timer 17. The detailed operation of this CPU 10 will be discussed later.

Stored in the ROM 11 are various kinds of fixed data used in various processes the CPU 10 performs, in addition to the aforementioned control program. The contents of the ROM 11 are read out by the CPU 10. That is, the CPU 10 reads out the control program (instructions) from the ROM 11, and decodes and executes the instructions, and also reads out fixed data from the ROM 11 and uses it in various processes.

Also stored in the ROM 11 is pattern data which is used in an automatic accompaniment. This pattern data is used to generate an accompaniment pattern of, for example, two to sixteen bars. This pattern data is a set of unit pattern data each corresponding to a single note. The unit pattern data consists of 4-byte data which designates a step time, a note number (key code), a gate time and a velocity, as shown in FIG. 15. The step time is used to designate the time at which tone generation starts (tone generation timing). This step time represents the time from the top of one bar. The note number is used to designate a pitch. The gate time is used to designate a tone-ON time. The velocity is used to designate the strength (volume) of a tone to be generated. This pattern data may be stored in the RAM 12 which will be discussed later.

The RAM 12 is used to temporarily store various kinds of data the CPU 10 uses in various processes. The entire or partial area of this RAM 12 may be designed to be backed up by battery power. In this case, the stored contents of the RAM 12 are held even after electric power is cut off. When electric power is turned on again, therefore, the state of the automatic accompaniment apparatus at the power-off time is restored, so that the automatic accompaniment can start immediately. The entire area of the RAM 12 may be designed to be initialized when electric power is turned on while a special operation is performed, e.g., while a specific switch on the operation panel 13 or a specific key on the keyboard instrument 14 is depressed, or both are operated. This design can forcibly initialize the automatic accompaniment apparatus regardless of whether the RAM 12 is backed up by battery power.

Defined in this RAM 12 are buffers, registers, counters, flags and so forth. The specific buffers, registers, counters, flags, etc. which are used in this embodiment will be discussed as they are mentioned; however, some essential elements will be described below.

(a) TYPE flag: used to indicate whether a player is a beginner (TYPE flag=0) or a skilled person (TYPE flag=1). This TYPE flag is referred to at the time chord information to be described later is generated.

(b) Automatic accompaniment flag: used to indicate whether the automatic accompaniment apparatus is performing an automatic accompaniment (automatic accompaniment flag=1) or is not performing an automatic accompaniment (automatic accompaniment flag=0). This automatic accompaniment flag is referred to in a timer interrupt process to be described later.

(c) Chord root register: used to store a chord root.

(d) Chord type register: used to store a chord type.

(e) Skill-level determining buffer: a cyclic buffer having 32 entries (TPOINT0 to TPOINT31) which is used to trace the keyboard operation by the player. Every time the lower keyboard is operated, data "1" representing a skilled person is written in an entry of the skill-level determining buffer when the number of depressed keys is equal to or greater than "3" and a chord is formed, and data "0" representing a beginner is written in an entry of the skill-level determining buffer when the number of depressed keys is less than "3" or when the number of depressed keys is equal to or greater than "3" but a chord is not formed. This skill-level determining buffer is used to determine whether the player is a skilled person or a beginner.

(f) Trace pointer TPOINT: indicates the current entry of the skill-level determining buffer.

(g) Register TYPDAT: used to store data which is obtained by adding up the contents of the individual entries of the skill-level determining buffer. Whether the player is a beginner or a skilled person is determined in accordance with the content of this register TYPDAT.

Figure 13:
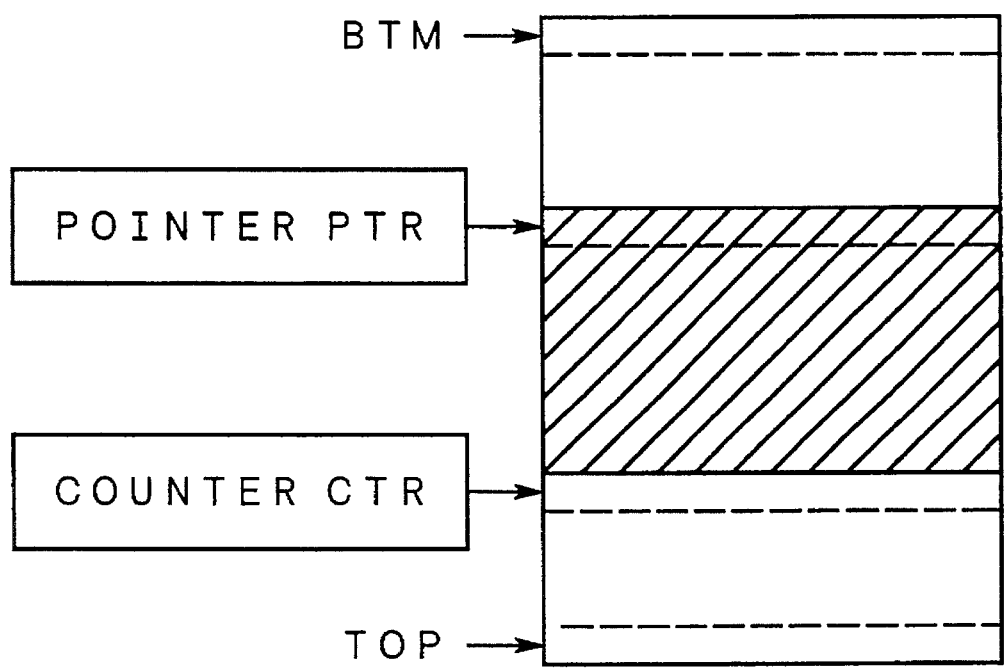
FIG. 13 is a diagram showing the structure of a receiving buffer used in this embodiment.

(h) Receiving buffer: used to temporarily store a MIDI message received by the MIDI controller 18 which will be discussed later. This receiving buffer comprises a counter CTR, a pointer PTR and a memory area as shown in FIG. 13, for example. This receiving buffer serves as a FIFO (Fast-In-Fast-Out) memory under the control of the CPU 10. The memory area has, for example, 256 entries in each of which a MIDI message is stored.

The counter CTR is used to indicate the location of the memory area where a received MIDI message is to be written. This counter CTR is controlled to always point an entry next to the entry where the MIDI message has been written last. The initial value of this counter CTR is "0" and the count is incremented every time a MIDI message is written. When the result of the count-up exceeds a maximum value TOP, the count is rounded to be a minimum value BTM.

The pointer PTR is used to indicate the location of the MIDI message to be read out in the memory area. This pointer PTR is controlled to always point an entry next to the entry where the last read MIDI message is stored, i.e., the entry of the next MIDI message to be read out. The initial value of this pointer PTR is "0" and the count is incremented every time a MIDI message is read out. When the result of the count-up exceeds a maximum value TOP, the count is rounded to be a minimum value BTM.

When the content of the counter CTR coincides with the content of the pointer PTR, the receiving buffer is determined as empty. The receiving buffer will be determined as full, when the counter CTR is count up and the content of the counter CTR matches with the content of the pointer PTR. In this case, the receiving buffer is controlled in such a way as to suppress the reception of a MIDI message. When the content of the counter CTR does not coincide with the content of the pointer PTR, it is determined that a MIDI message is present in the receiving buffer.

A MIDI message is written in this receiving buffer in a MIDI-IN interrupt process which will be discussed later. A MIDI message is read out from this receiving buffer in a MIDI-IN interrupt process which will also be discussed later. The receiving buffer may also be constituted of a known FIFO memory element.

(i) Register group RG: The register group RG is used to manage the tone-ON state for each part. The number of the register groups RG is n corresponding to the number of the parts. In this embodiment, the polyphonic number for each part is "8". As shown in FIG. 14, for example, each register group RG comprises eight blocks corresponding to the polyphonic number, and a tone-ON channel is assigned to each block. Each block corresponds to one tone, and has a 3-byte area for storing a "key code and its ON/OFF state", "velocity" and "remaining gate time".

The key code (7 bits) is used to indicate the pitch. The ON/OFF bit (1 bit) is used to indicate whether the tone indicated by the key code is in a key-ON state or a key-OFF state. The velocity (7 bits) is used to indicate the strength of a tone to be generated. As this velocity, velocity data in the pattern data is used. The remaining gate time (7 bits) is used to indicate the remaining tone-ON time of a tone being generated (tone whose ON/OFF bit is "1"). The gate time in the pattern data is used as the initial value of the remaining gate time. Although only one register group RG corresponding to one part is illustrated in FIG. 14, there are actually register groups RG of the same structure in association with parts 1–4.

(j) Bar register BRR and beat register BTR: The bar register BRR is used to manage the progress of a bar. This bar register BRR can store four digits of a decimal number. The beat register BTR is used to manage the progress of a beat. This beat register BTR is incremented every step time. In this embodiment, one beat is divided, for example, into 48 steps. Therefore, in a case of four beats, the content of the beat register BTR is rounded to zero when the content thereof reaches 192. At this time, the bar register BRR is incremented. The progress of an automatic accompaniment is managed by the bar register BRR and the beat register BTR.

The operation panel 13 is provided with various switches, indicators and the like for communication between the automatic accompaniment apparatus and the player. The details of the operation panel 13 will be described later.

The keyboard instrument 14 comprises an upper keyboard and a lower keyboard though not illustrated in detail. In an automatic accompaniment mode, the upper keyboard is used for playing a melody, while the lower keyboard is used for chord designation.

The key-depression state of this keyboard instrument 14 is read into the CPU 10 in the following manner. That is, the CPU 10 sends a scan signal to the keyboard instrument 14. In response to this scan signal, the keyboard instrument 14 sends a signal indicating the ON/OFF of each key to the CPU 10. The CPU 10 produces key data associating the ON/OFF state of each key with one bit based on the received signal. This key data is stored in the RAM 12 under the control of the CPU 10, and is used to determine the presence or absence of a key event. The details will be given later.

The tone generator 15 generates tone signals under the control of the CPU 10. The tone signals produced by this tone generator 15 are sent to a speaker system 16. The speaker system 16 comprises an amplifier, a loudspeaker and the like, for example, and converts the tone signal sent from the tone generator 15 to an acoustic signal.

The timer 17 generates an interrupt signal at an interval corresponding to a beat. The interval of the generation of this interrupt signal is determined by data set in the timer 17 by the CPU 10. The data will be described later. The interrupt signal generated by this timer 17 is supplied to the input terminal INT2 of the CPU 10. Since a quarter note is controlled with the resolution of $1/48$ in this embodiment as mentioned above, 48 interrupt signals are generated per a quarter note. The timer interrupt process routine which will be described later is called in accordance with the interrupt signal from this timer 17. The bar register BRR and beat register BTR are updated in the timer interrupt process routine.

The MIDI controller 18 is used to send a MIDI message to an external device or to receive a MIDI message from an external device. External devices include, for example, an electronic musical instrument, a tone generation module, a computer and a sequencer. In receiving a MIDI message from an external device, the MIDI controller 18 generates an interrupt signal when the data sent in a bit serial form from the external device amounts to, for example, 1-byte data. This interrupt signal is supplied to the input terminal INT1 of the CPU 10.

Figure 2:
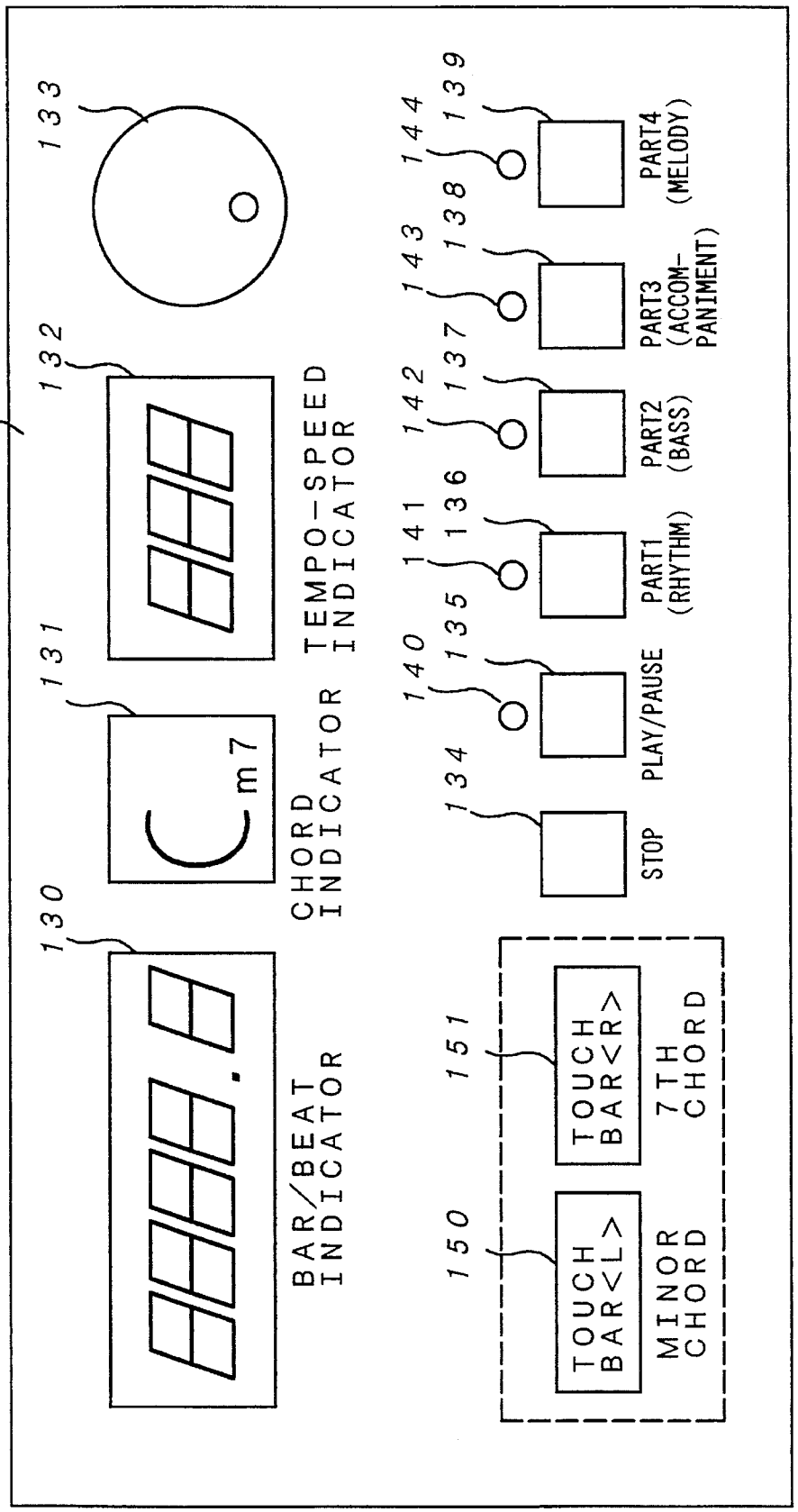
FIG. 2 is a diagram showing one example of an operation panel used in this embodiment.

FIG. 2 exemplifies the structure of the operation panel 13 adapted for use in the automatic accompaniment apparatus. A bar/beat indicator 130 is constituted of an LED indicator having 7 segments for five digits. Displayed in the upper four digits of this bar/beat indicator 130 is the "bar" which is being currently played in an automatic accompaniment, i.e., the content of the bar register BRR. Displayed in the lower one digit of this bar/beat indicator 130 is the "beat" which is the current beat in the automatic accompaniment, i.e., the beat corresponding to the content of the beat register BTR (specifically, in the case of four beats, "1" plus the quotient obtained by dividing the content of the beat register BTR by 48). The display content of the bar/beat indicator 130 is sequentially updated in accordance with the progress of an automatic accompaniment.

A chord indicator 131 is constituted, e.g., of LCD. The chord indicator 131 indicates a name of chord (chord root and chord type) discriminated by a chord discrimination process to be described later. In this embodiment, the constitution is made such that chord information is generated on the basis of the key data produced on the basis of the lower keyboard or MIDI message sent from MIDI channel of channel number "1". The channel number of MIDI channel is not limited to "1", the chord information may be generated on the basis of MIDI message sent from other MIDI channel. Further, the chord information may be generated on the basis of MIDI messages sent from a plurality of MIDI channels.

A tempo-speed indicator 132 is constituted, e.g., of an LED indicator having 7 segments for three digits. The tempo-speed indicator 132 displays a current tempo-speed.

Each of the bar/beat indicator 130 and the tempo-speed indicator 132 may be selected from an LCD indicator, a CRT indicator and other various indicators in addition to an LED indicator having 7 segments. Similarly, the chord indicator 131 may be selected from a CRT indicator and other various indicators in addition to an LCD indicator.

An incrementer 133 is used for setting the tempo-speed. The tempo-speed is increased, for example, when the incrementer 133 is turned clockwise, and it is decreased when the incrementer 133 is turned counterclockwise. The tempo-speed set by the incrementer 133 is displayed on the tempo-speed indicator 132.

A stop switch 134 is used for stopping the automatic accompaniment. That is, if the stop switch 134 is depressed while the automatic accompaniment is performing, the automatic accompaniment stops. A play/pause switch 135 is used for starting or temporarily stopping the automatic accompaniment. If the play/pause switch 135 is depressed while the automatic accompaniment is being stopped or paused (temporary stop), the automatic accompaniment is started or resumed, and an LED indicator 140 is turned on. If the play/pause switch 135 is depressed while the automatic accompaniment is performing, the automatic accompaniment comes into a paused state, and at the same time, the LED indicator 140 is turned off.

Part switches 136–139 are used for starting or stopping the generation of tones for the parts 1–4. In this automatic accompaniment apparatus, the pattern data for each part is always read out from ROM 11 according to contents of the bar register BRR and the beat register BTR. And, whether or not to generate a tone is determined depending upon whether or not the part switches 136–139 are on.

The part 1 switch 136 is used for directing the tone generation for a rhythm part. When the part 1 switch 136 is depressed, an LED indicator 141 is turned on, and at the same time, the tone for a rhythm part is generated. When it is again depressed, the LED indicator 141 is turned off, and at the same time, the tone generation for a rhythm part is terminated. Similarly, the part 2 switch 137 is used for directing the tone generation for a bass part. When the part 2 switch 137 is depressed, an LED indicator 142 is turned on, and at the same time, the tone for a bass part is generated. When it is again depressed, the LED indicator 142 is turned off, and at the same time, the tone generation for a bass part is terminated.

Similarly, the part 3 switch 138 is used for directing the tone generation for an accompaniment part (e.g., a chord part). When the part 3 switch 138 is depressed, an LED indicator 143 is turned on, and at the same time, the tone for an accompaniment part is generated. When it is again depressed, the LED indicator 143 is turned off, and at the same time, the tone generation for an accompaniment part is terminated. Similarly, the part 4 switch 139 is used for directing the tone generation for a melody part. When the part 4 switch 139 is depressed, an LED indicator 144 is turned on, and at the same time, the tone for a melody part is generated. When it is again depressed, the LED indicator 144 is turned off, and at the same time, the tone generation for a melody part is terminated.

Each pattern data for the rhythm part, the bass part and the accompaniment part is constituted of the pattern data of approximately 1 to several bars. The pattern data for the melody part is constituted of pattern date of whole bars corresponding to 1 piece of music.

The operation panel 13 is provided with a timbre selecting device for selecting a desired timbre from a plurality of timbres and a loudness control device for adjusting the loudness, while these devices are not shown.

The setting state of each switch, etc., on the above operation panel 13 is taken into the CPU 10 as follows. That is, the CPU 10 sends a scan signal to the operation panel 13. The operation panel 13 responds to the scan signal to send a signal representing on/off of each switch and a signal representing the current value of the incrementer 133 to the CPU 10. The CPU 10 produces panel data based on the received signals. The panel data consists of switch data in which on/off of each switch corresponds to 1 bit and incrementer data representing the current value of the incrementer 133. The panel data is stored in the RAM 12 under the control of the CPU 10 and used for deciding the presence or absence of a panel event (which details will be given later).

A touch bar <L> 150 and a touch bar <R> 151 are used for designating a chord type. These are generally mounted on the key slip portion of the electronic musical instrument, while FIG. 2 shows them on the operation panel 13 for convenience. The operation states of the touch bar <L> 150 and the touch bar <R> 151 are taken into the CPU 10 in the same way as that for each switch on the operation panel 13. The touch bar <L> 150 is used for selecting miner. Similarly, the touch bar <R> 151 is used for selecting seventh. The four chord types can be selected by the touch bar <L> 150 and the touch bar <R> 151. That is, minor is selected as a chord type when the touch bar <L> 150 is operated, seventh is selected as a chord type when the touch bar <R> 151 is operated, major is selected as a chord type when none of the touch bar <L> 150 and touch bar <R> 151 are operated, and minor-seventh is selected as a chord type when both of the touch bar <L> 150 and touch bar <R> 151 are operated.

The touch bar <L> 150 and the touch bar <R> 151 are used for "one-finger chord designation" to be discussed later. That is, in the "one-finger chord designation", a chord root is designated by depressing one key, and a chord type is designated by depressing the touch bar <L> 150 and/or the touch bar <R> 151.

The operation of one embodiment of an automatic accompaniment apparatus for which the chord information generating apparatus of the present invention is applied will be explained in detail with reference to flow charts shown in FIGS. 3 to 12.

Figure 3:
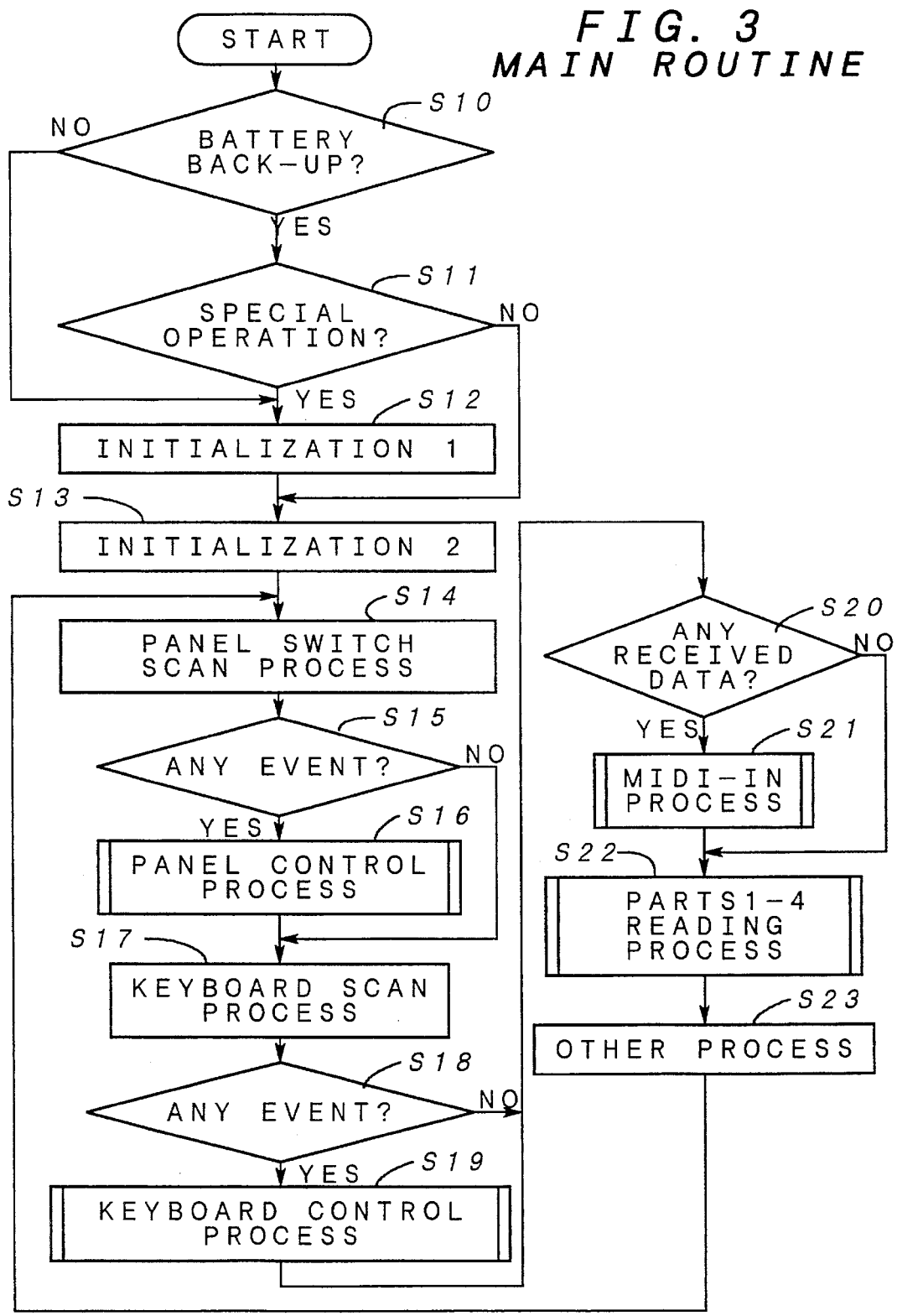
FIG. 3 is a flowchart illustrating a main process according to this embodiment.

(1) Main process (FIG. 3)

FIG. 3 shows a main routine in an embodiment of an automatic accompaniment apparatus for which the chord information generating apparatus of the present invention is adapted. The main routine is initiated by turning power on. In the main routine, first, whether or not battery back-up is done is checked (step S10). After it is decided that battery back-up is done, whether or not a special operation is done is checked (step S11). If it is decided that the special operation is done, "initialization 1" is executed (step S12). If this is not the case, the "initialization 1" is skipped. Meanwhile, if it is decided in the above step S10 that battery back-up is not done, the "initialization 1" is executed.

In the above "initialization 1", registers, flags, etc., defined in part of the RAM 12 are initialize. Those registers, flags, etc. are used for recovering a state at the time electric power is cut off. Therefore, after the "initialization 1" is executed, the process thereafter is carried out in a state where battery back-up is not done even if battery back-up is done. In the "initialization 1", TYPE flag is cleared to 0.

Then, "initialization 2" is executed (step 13). In the "initialization 2", registers, flag, etc., defined in other portion of the RAM 12 are initialized. In the "initialization 2", all the entries of the skill-level determining buffer are cleared to "0" when TYPE flag is "0". All the entries of the skill-level determining buffer are cleared to "1" when TYPE flag is "1".

If battery back-up is done and if the special operation is not done, the "initialization 2" alone is executed by the above process. If the above is not the case, both the "initialization 1" and the "initialization 2" are executed. Therefore, if battery back-up is done and if no special operation is done, the state of TYPE flag at the time electric power is cut off continues. In this case, if the skill level of a player is determined on the basis of the content in the skill-level determining buffer, the same determination result as that before electric power is cut off is obtained. If battery back-up is not done, or if the special operation is done while battery back-up is done, TYPE flag is cleared to "0" and all the entries of the skill-level determining buffer are cleared to "0". In this case, therefore, when the skill level of a player is determined on the basis of the content of the skill-level determining buffer, the player is determined to be a beginner.

After the above process finishes, a panel switch scan process is executed (step 14). In the panel switch scan process, the CPU 10 produces panel data ("new panel data" hereinafter) on the basis of the signals from the operation panel 13, and stores it in a predetermined area of the RAM 12 as already explained. Then, an Exclusive-OR operation is performed between the old panel data and the above new panel data to form a panel event map. The term "old panel data" refers to a panel data which has been produced on the basis of the signals from the operation panel 13 and already stored in the RAM 12 in the previous panel switch scan process.

Then, it is checked whether an event is present or absent (step S15). This checking is performed by checking whether or not at least one bit which is ON is present in the panel event map. If there is no bit which is ON in the panel event map, it is decided that no event has occurred, and if there is at least one bit which is ON, it is decided that an event has occurred. If it is decided in this step S15 that an event has occurred, a panel control process (step 16) is executed. If the above is not the case, the panel control process is skipped. The panel control process will be discussed in detail later.

Then, a keyboard scan process (step 17) is executed. In the keyboard scan process, the CPU 10 produces key data ("new key date" hereinafter) on the basis of the signals from the keyboard instrument 14, and stores it in a predetermined area of the RAM 12 as already explained. Then, an exclusive-OR operation is performed between the old key data and the above new key data to form an event map. The term "old key data" refers to a key data which has been produced on the basis of the signals from the keyboard instrument 14 and already stored in the RAM 12 in the previous keyboard scan process.

Then, it is checked whether an event is present or absent (step S18). This checking is performed by checking whether or not at least one bit which is ON is present in the above key event map. If there is no bit which is ON in the key event map, it is decided that no event has occurred, and if there is at least one bit which is ON, it is decided that an event has occurred. If it is decided that an event has occurred, a keyboard control process is executed (step 19). If the above is not the case, the keyboard control process is skipped. The keyboard control process will be discussed in detail later. The processes in steps S17 and S18 are realized by the key-depression detecting means.

Then, it is checked whether or not received data (MIDI message) is present in the receiving buffer (step S20). This checking is performed by checking whether or not the content of the counter CTR agrees with the content of the pointer PTR. If it is decided that received data is present in the receiving buffer, an MIDI-IN process is executed (step S21). If the above is not the case, the MIDI-IN process is skipped. The MIDI-IN process will be discussed in detail later.

Then, a parts 1–4 reading process is executed (step S22). This process is to read the pattern data of each part and to generate music tone signals. This parts 1–4 reading process will be discussed in detail later.

Then, "other process" is executed (step S23). In this "other process", a timbre is selected and a volume is set. Thereafter, the routine returns to step S14, and the steps S14 to S23 are executed repeatedly. In the course of the above repeated execution, when an event takes place on the operation panel 13 or the keyboard instrument 14, or MIDI message is received, the processes corresponding thereto are executed so that the automatic accompaniment apparatus performs its action as such.

Figure 4:
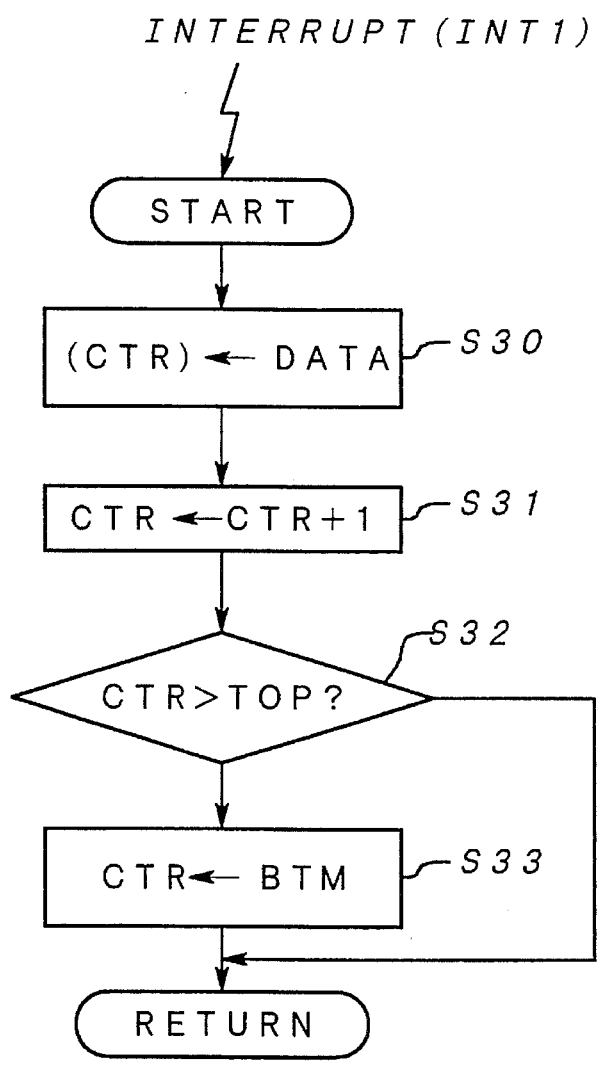
FIG. 4 is a flowchart illustrating a MIDI-IN interrupt process according to this embodiment.

(2) MIDI-IN interrupt process (FIG. 4)

The MIDI-IN interrupt process is executed by interrupting the main routine process. In the MIDI-IN interrupt process, an MIDI message received by the MIDI controller 18 is stored in the receiving buffer. The MIDI controller 18 generates an interrupt signal when the data serially sent from the external device amounts to 1 byte. This interrupt signal is supplied to the input terminal INT1 of the CPU 10, whereby the action of the CPU 10 is put to an interrupt mode, and the CPU 10 calls the MIDI-IN interrupt process routine.

In the MIDI-IN interrupt process, first, the data read out from the MIDI controller 18 is written in a site of the receiving buffer indicated by the counter CTR (step S30). Then, the content of the counter CTR is incremented (step S31), and then it is checked whether or not the result has exceeded a maximum value TOP of the memory area (step S32). If it is decided that the result does not exceed the maximum value TOP, the routine is returned from the MIDI-IN process routine. If it is decided that the result has exceeded the maximum value TOP, the content of the counter CTR is rewritten as a minimum value BTM (step S33), and then the routine is returned from the MIDI-IN process routine. The site to which the routine returns is the site of the main routine where the main routine is interrupted. Due to the above, the function of rounding the maxim value TOP to the minimum value BTM is realized. Although not shown in FIG. 4, a process is executed for inhibiting the intake of an MIDI message if the receiving buffer is full.

Figure 5:
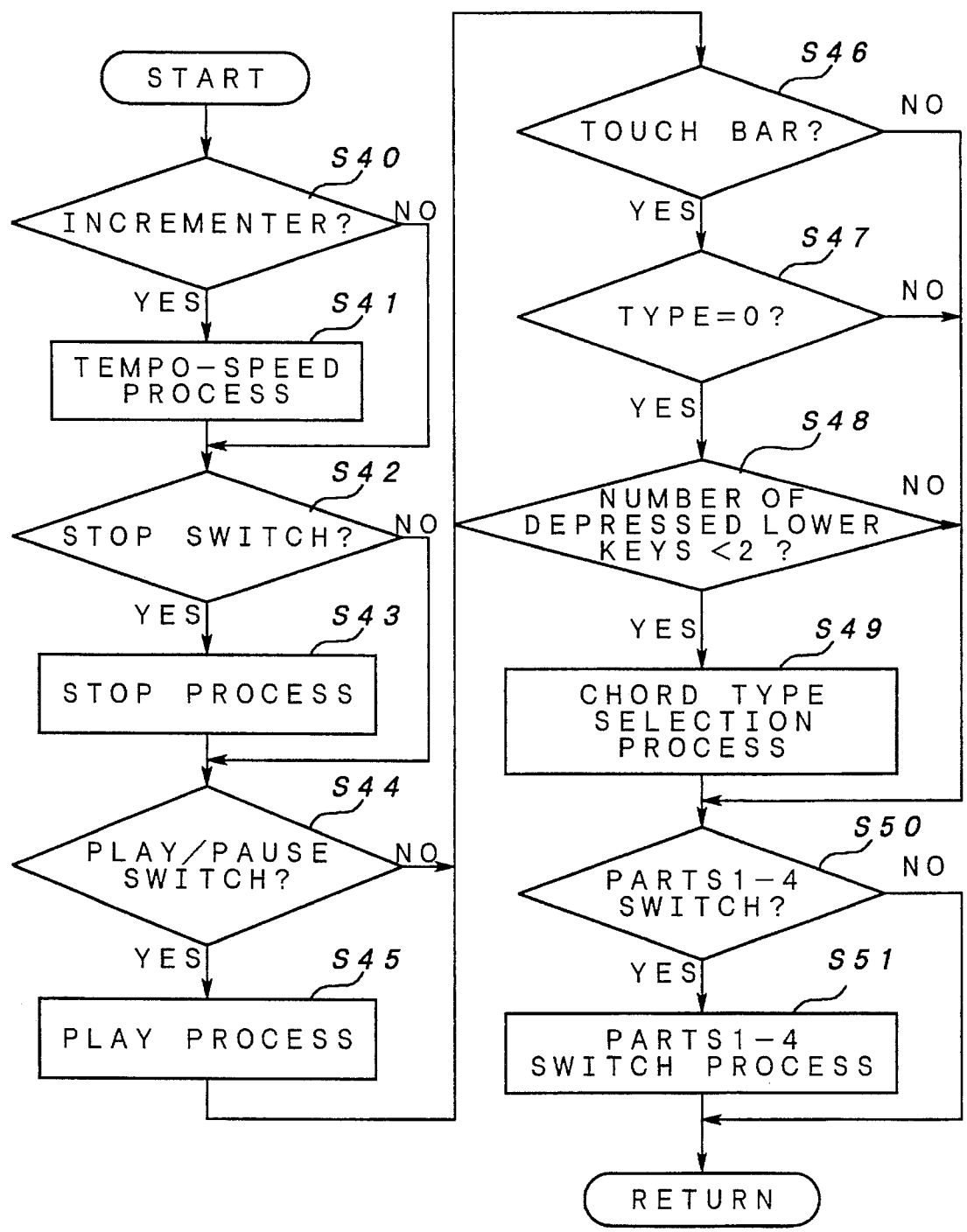
FIG. 5 is a flowchart illustrating a panel control process according to this embodiment.

(3) Panel control process (FIG. 5)

The panel control process executed in step S16 of the main routine will be explained in detail with reference to the flow chart in FIG. 5 hereinafter.

The panel control process routine is called if it is decided in the main routine that an event such as panel switches, an incrementer 133 or the like has occurred. In the panel control process, first, it is checked whether or not an event of the incrementer 133 has occurred (step S40). The incrementer data in the old panel data and that in the new panel data are compared, and if these differ, it is decided that the event of the incrementer 133 has occurred, and then, a tempo-speed process is executed (step S41). If the above is not the case, the tempo-speed process is skipped. In the tempo-speed process, the data corresponding to the incrementer data in the new panel data is set in the timer 17, whereby the interval time of the interrupt signal to be generated by the timer 17 is changed. As a result, the tempo-speed of automatic accompaniment is changed. Further, the data corresponding to the incrementer data in the new panel data is sent to the tempo-speed indicator 132, whereby the new tempo-speed is indicated on the tempo-speed indicator 132.

Then, it is checked whether or not the event of the stop switch 134 has occurred (step S42). This checking is performed by checking whether or not the bit corresponding to the stop switch 134 in the panel event map is "1". If it is decided that the event of the stop switch 134 has occurred, a stop process is executed (step S43). If the above is not the case, the stop process is skipped. In the stop process, the automatic accompaniment flag is cleared to "0", whereby, in a timer interrupt process (FIG. 9), the update of the bar register BRR and the beat register BTR is prevented. Due to this, the automatic accompaniment is stopped, and the tone generation of each part is stopped.

Then, it is checked whether or not the event of the play/pause switch 135 has occurred (step S44). This checking is performed by checking whether or not the bit corresponding to the play/pause switch 135 in the panel event map is "1". If it is decided that the event of the play/pause switch 135 has occurred, a play process is executed (step S45). If the above is not the case, the play process is skipped. In the play process, if it is decided that the automatic accompaniment flag is "0", i.e., that the play/pause switch 135 is depressed while the automatic accompaniment is halted, the automatic accompaniment flag is set at "1", and at the same time, the LED indicator 140 is turned on, whereby the update of the bar register BRR and the beat register BTR is started in a timer interrupt process to be described later (FIG. 9), and the automatic accompaniment progresses. On the other hand, if it is decided that the automatic accompaniment flag is "1", i.e., that the play/pause switch 135 is depressed while the automatic accompaniment is performed, the automatic accompaniment flag is cleared to "0", and at the same time, the LED indicator 140 is turned off, whereby the tone generation of each part is stopped as is done if the above stop switch 134 is depressed.

Then, it is checked whether or not the event of the touch bar <L> 150 or the touch bar <R> 151 has occurred (step S46). This checking is performed by checking whether or not the bit corresponding to the touch bar <L> 150 or the touch bar <R> 151 in the panel event map is "1". If it is decided that neither the event of the touch bar <L> 150 nor the event of the touch bar <R> 151 has occurred, the routine jumps to steps S50. If the above is not the case, it is checked whether or not the TYPE flag is "0" (step S47). If it is decided that the TYPE flag is not "0", it is recognized that a player is not a beginner (is a skilled person), and the routine jumps to step S50. That is, if the player is a skilled one, the touch bar <L> 150 and the touch bar <R> 151 are ignored even if operated. If it is decided in the above step S47 that the TYPE flag is "0", it is recognized that a player is a beginner, and then, it is checked whether or not the number of keys simultaneously depressed in the lower keyboard is smaller than "2", that is, it is checked whether or not one key alone is depressed (step S48). The number of keys depressed in the lower keyboard is calculated by counting the number of bits which are ON in the range corresponding to the lower keyboard in the new key data. The number of depressed keys hereinafter is similarly decided.

Figure 6:
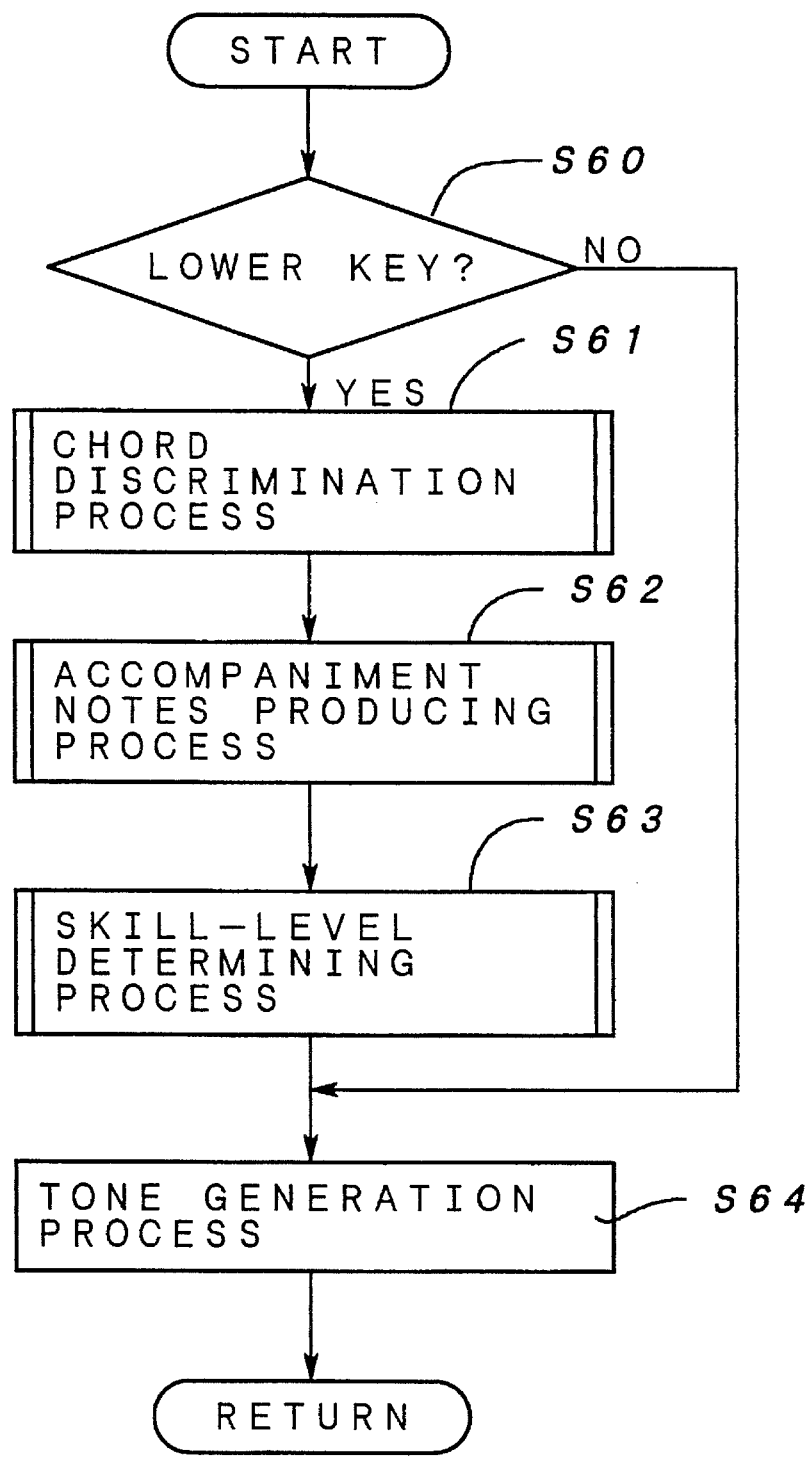
FIG. 6 is a flowchart illustrating a keyboard control process according to this embodiment.

If it is decided that the number of keys depressed in the lower keyboard is "2" or more, the routine skips to step S50. If the above is not the case, a chord type selection process is executed (step S49). That is, depending upon the operation state of the touch bar <L> 150 or the touch bar <R> 151, one of the chord types is selected. Data representing the selected chord type is stored in the chord type register, and used when chord information is generated in a keyboard control process to be discussed later (FIG. 6). By the above process of steps S46 to S49, the function of one-finger chord designation is realized.

Then, it is checked whether or not the event of the part switches 136 to 139 has occurred (step S50). This checking is performed by checking whether or not each bits corresponding to the part switches 136 to 139 in the panel event map is "1". If it is decided that the event of the part switches 136 to 139 has occurred, a parts 1 to 4 switch process is executed (step S51). If the above is not the case, the parts 1 to 4 switch process is skipped. Then, the routine returns from the above panel control process routine to the main routine.

In the parts 1 to 4 switch process executed in step S51, if any one of the part switches 136 to 139 is depressed, the tone generation for the concerned part is started or stopped. That is, when the part switch is depressed while the tone generation is being stopped, the tone generation is started. When the part switch is depressed while the tone generation is being executed, the tone generation is stopped. When the tone generation is started by depressing the part switch 136 to 139, the above parts 1 to 4 switch process is executed as follows. Of these tones which are to be under generation (the tones for which the pattern data reading is performed while the tone generation is stopped), a part whose remaining gate time is less than a predetermined time is prevented from the tone generation, and only a part whose remaining gate time is greater than a predetermined time is allowed to start the tone generation. By the above process, the time which the CPU 10 requires for a channel assignment process is saved and the load of the CPU 10 is decreased.

(4) Keyboard control process (FIG. 6)

The keyboard control process executed in step S19 of the main routine will be explained in detail with reference to the flow chart of FIG. 6 hereinafter.

The above keyboard control process routine is called when it is decided in the main routine that a keyboard event has occurred. In the keyboard control process, first, it is checked whether or not the key having the event is a lower key (which refers to a key in the lower keyboard, and is used in the same meaning hereinafter) (step S60). This checking is performed by checking whether or not any bit which corresponds to the lower key in the key event map is ON. If it is decided that the event is not that of a lower key, it is recognized that the event is that of an upper key (which refers to a key in the upper keyboard), and the routine jumps to step S64 for the tone generation for the general depression of a key.

Figure 10:
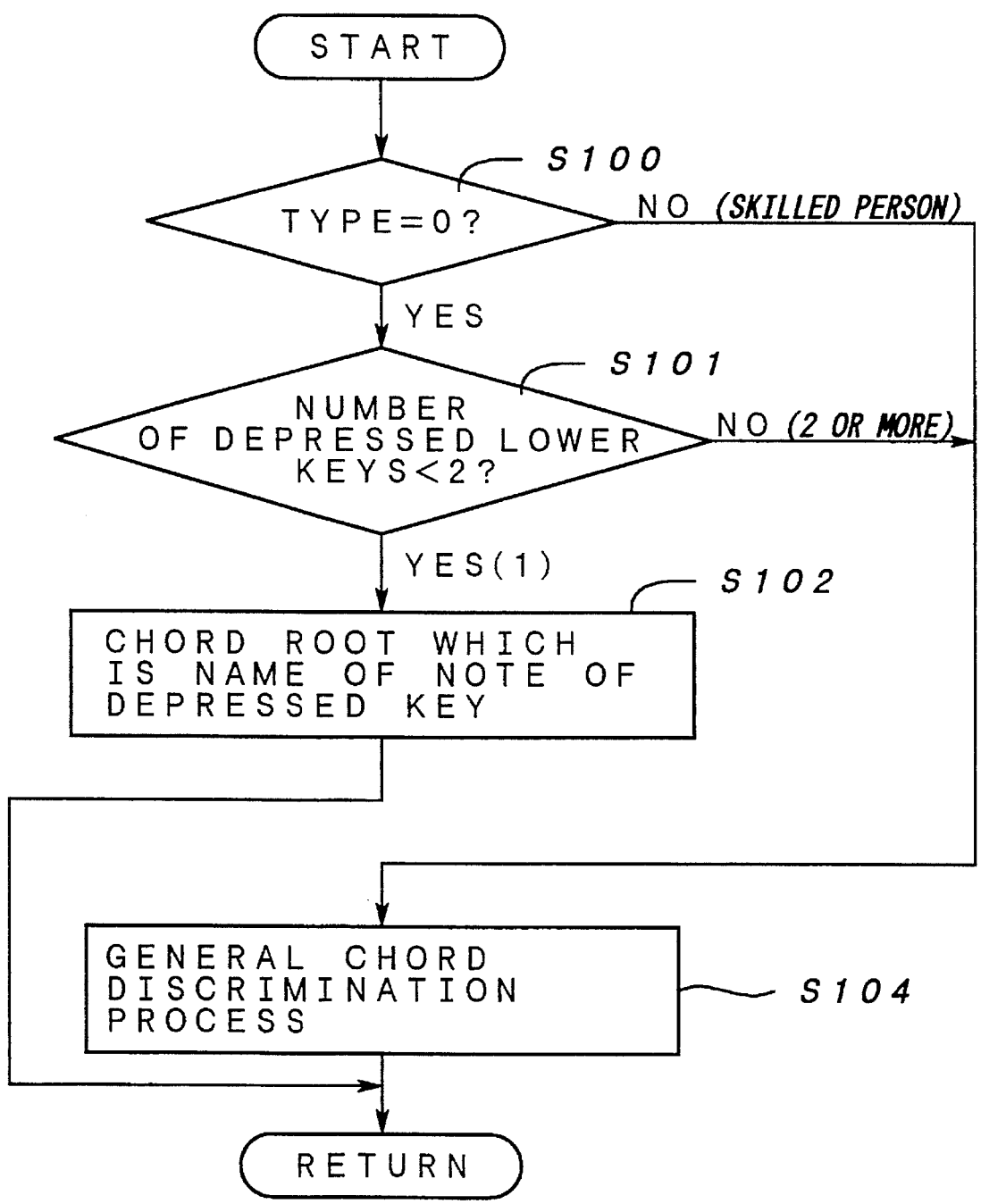
FIG. 10 is a flowchart illustrating a chord discrimination process according this embodiment.

On the other hand, if it is decided in step S60 that the event is that of a lower key, a chord discrimination process is executed (step S61). The chord discrimination process is realized with the chord discriminating means of the present invention. The flow chart of FIG. 10 shows the chord discrimination process in detail.

The above chord discrimination process will be explained hereinafter. In the chord discrimination process, first, it is checked whether or not the TYPE flag is "0" (step S100). If it is decided that the TYPE flag is not "0", it is decided that a player is a skilled person, and the routine jumps to step S104. If the above is not the case, it is decided that the player is a beginner, and then it is checked whether or not the number of keys depressed in the lower keyboard is smaller than "2", that is, whether or not one key alone is depressed (step S101).

If it is decided that the number of keys depressed in the lower keyboard is "2" or more, the routine jumps to step S104. If the above is not the case, the note name of the depressed key is employed as a chord root (step S102). The chord root is stored in the chord root register. As a chord type in this case, the chord type stored in the chord type register is employed. The chord information generating apparatus can be constituted without the touch bars 150 and 151. In this case, a chord type of, for example, major is set in the chord type register. Then, the routine returns from the chord discrimination process routine to the keyboard control process routine. The above chord root and chord type are used in an accompaniment notes producing process to be executed in a subsequent step S62.

On the other hand, if it is decided in the above step S100 that the TYPE flag is not "0", i.e., that the player is a skilled person, or if it is decided in the above step S101 that the player is a beginner but that two keys or more are depressed, a general chord discrimination process is executed (steps S104). The general chord discrimination process is a process for discriminating the chord root and the chord type on the basis of the key-depression state in the lower keyboard. The data representing the discriminated chord type is stored in the chord type register, and the data representing the discriminated chord root is stored in the chord root register. The chord discrimination in step S104 may be performed by a known chord discrimination method, e.g., a method in which the chord is discriminated by consecutively comparing a chord table prepared in advance and the key-depression state detected with the key-depression detecting means. Then, the routine returns from the above chord discrimination process routine to the keyboard control process routine.

Figure 11:
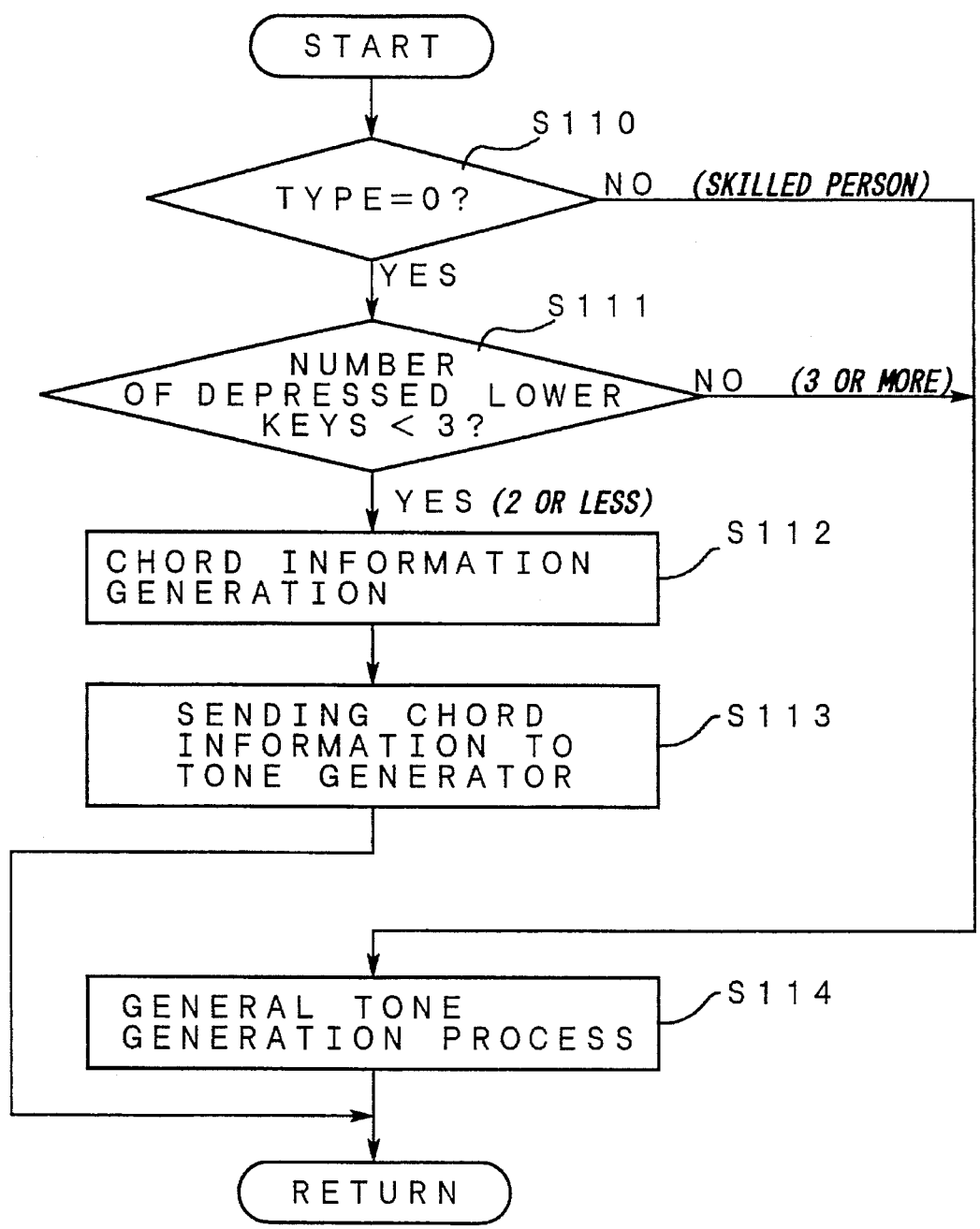
FIG. 11 is a flowchart illustrating an accompaniment notes producing process according to this embodiment.

In the keyboard control process routine, then, the accompaniment notes producing process is executed (step S62). The accompaniment notes producing process is realized with the accompaniment notes producing means of the present invention. The flow chart of FIG. 11 shows the accompaniment notes producing process in detail.

The above accompaniment notes producing process will be explained hereinafter. In the accompaniment notes producing process, first, it is checked whether or not the TYPE flag is "0" (step S110). If it is decided that the TYPE flag is not "0", it is recognized that the player is a skilled person, and the routine jumps to steps S114. If the above is not the case, it is recognized that the player is a beginner, and then, it is checked whether or not the number of keys depressed in the lower keyboard is smaller than "3", that is, whether or not one or two keys are depressed (step S111).

If it is decided that the number of keys depressed in the lower keyboard is "3" or more, the routine jumps to step S114. If the above is not the case, chord information is generated (step S112). That is, chord information data for generating three or more chord tones, more specifically, a key code is generated on the basis of the chord root stored in the chord root register and the chord type stored in the chord type register. The chord information is used to change a pitch of a tones which is being generated on the basis of the pattern data in the "key-on output" in step S85. Then, the chord information is sent to the tone generator 15 (step S113). Then, the routine returns from the above accompaniment notes producing process routine to the keyboard control process routine.

If it is decided in the above step S110 that the player is a skilled person or if it is decided in the above step S111 that the player is a beginner but presses 3 keys or more at the same time, a general tone generating process is executed (step S114). That is, the chord information, which comprises the note numbers and velocities on the basis of the depressed keys, for generating tones corresponding to all the keys depressed in the lower keyboard is sent to the tone generator 15 without having anything to do with whether or not chord is formed. Then, the routine returns from the accompaniment notes producing process routine to the keyboard control process routine.

Figure 12:
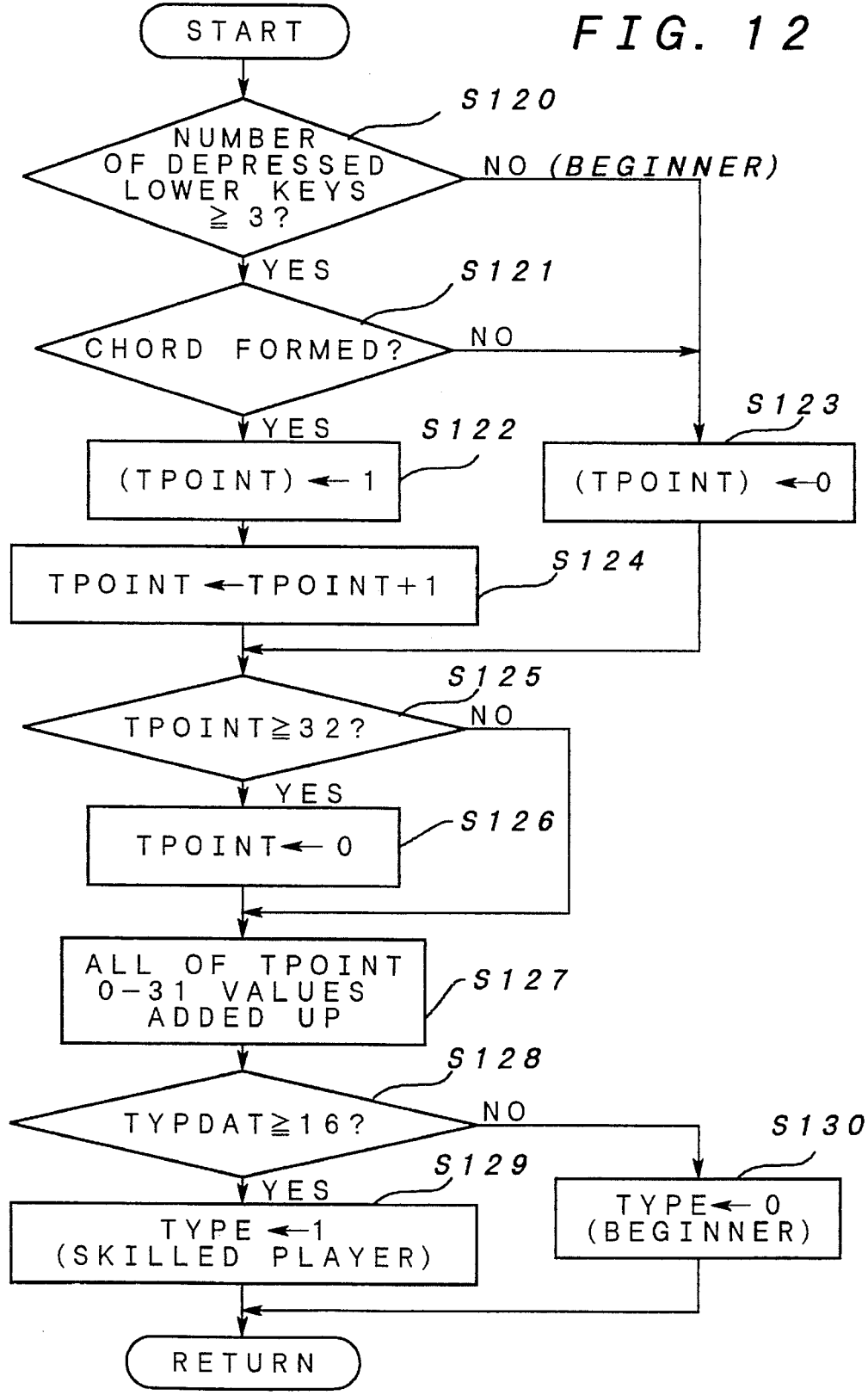
FIG. 12 is a flowchart illustrating a skill-level determining process according to this embodiment.

In the keyboard control process routine, then, a skill-level determining process is executed (step S63). The skill-level determining process is realized with the data producing means and the skill-level determining means of the present invention. The flow chart of FIG. 12 shows the skill-level determining process in detail.

The skill-level determining process will be explained hereinafter. In the skill-level determining process, first, it is checked whether or not the number of keys depressed in the lower keyboard is "3" or more (step S120). If it is decided that the above number is "3" or more, it is checked whether a chord is formed by the depressed keys (step S121). This checking is performed, for example, by sequentially comparing a previously prepared chord table with the key-depression state in the lower keyboard.

If it is decided that a chord is formed, data "1" representing a skilled person is written in the entry of the skill-level determining buffer indicated by the trace pointer TPOINT (step S122). On the other hand, if it is decided that no chord is formed, or if it is decided in the above step S120 that the number of keys depressed in the lower keyboard is less than "3", data "0" representing a beginner is written in the entry of the skill-level determining buffer indicated by the trace pointer TPOINT (steps S123).

Then, the trace pointer TPOINT is incremented (step S124), and it is checked whether or not the result is "32" or more (step S125). If it is decided that the result is "32", the trace pointer TPOINT is cleared to "0" (step S126). If the above is not the case, step S126 is skipped, whereby the function of the cyclic buffer is realized. That is, the data is consecutively stored while circulating the 32 entries of the skill-level determining buffer.

Then, the contents of all the entries (TPOINT 0–31) of the skill-level determining buffer are added up, and the resultant is stored in the register TYPDAT (step S127). Then, it is checked whether or not the content of the register TYPDAT is "16" or more, that is, the ratio is equal to or greater than 0.5 (step S128). If it is decided that the above content is "16" or more, "1" is set at the TYPE flag (step S129). Thereafter, the routine returns from the above skill-level determining routine to the keyboard control process routine. As a result, if the number of operations in which at least 3 keys are simultaneously depressed to form a chord is at least 16 out of the 32 operations of the lower keyboard, in other words, if at least 50% of the depressing operations form chords, it is determined that the player is a skilled one.

On the other hand, if it is decided in the above step S128 that the above number is less than "16", the TYPE flag is cleared to "0" (step S130). Thereafter, the routine returns from the above skill-level determining routine to the keyboard control process routine. As a result, if the number of operations in which at least 3 keys are simultaneously depressed to form a chord is less than 16 out of the 32 operations of the lower keyboard, it is determined that the player is a beginner. In the generation of chord information to be executed thereafter, the TYPE flag updated above is referred to.

After the above skill-level determining is finished, the tone generation process is executed in the keyboard control process routine (step 64). In the tone generation process, the general tone generation process for generating a tone corresponding to a depressed key is executed as far as the upper keyboard is concerned.

On the other hand, when keys are depressed in the lower keyboard, the tone generation process is executed for generating a plurality of tones on the basis of the chord information generated in the accompaniment notes producing process. More specifically, the key codes stored in the register group RG in a key-ON state and the key code included in the chord information obtained by the accompaniment notes producing process are compared. And, if a key code agreeing with the key code included in the chord information is found in the register group RG, no process is executed on the key code. Therefore, the tone generation for the key code stored in the register group RG is continued.

On the other hand, for a key code which is used for generating a chord tone before the above accompaniment note production but is no longer used for generating a chord tone after the accompaniment note production, the ON/OFF bit of the corresponding key code in the register group RG is cleared to "0", and a key-off output is executed. The term "key-off output" refers to a series of procedures for sending predetermined data to the tone generator 15 and replacing an envelope of a note which are being currently generated with an envelope which attenuates at a high rate, and the above term is also used in this sense hereinafter.

Further, for a tone which is not a chord tone before the accompaniment note production but is a new chord tone after the accompaniment note production, the new key code, of which the ON/OFF bit is set at "1", the remaining gate time and the velocity are stored in one block of the register group RG. In this case, the block used for the storing is selected from blocks of which the ON/OFF bit is "0". And a key-on output is executed. The term "key-on output" refers to a series of procedures for sending the pattern data (key code, velocity, etc.) to the tone generator 15 and starting the tone generation with data which is obtained by modifying the pattern data with the chord information, and is also used in this sense hereinafter. After the above tone generation process finishes, the routine returns from the keyboard control process routine to the main routine.

Figure 7:
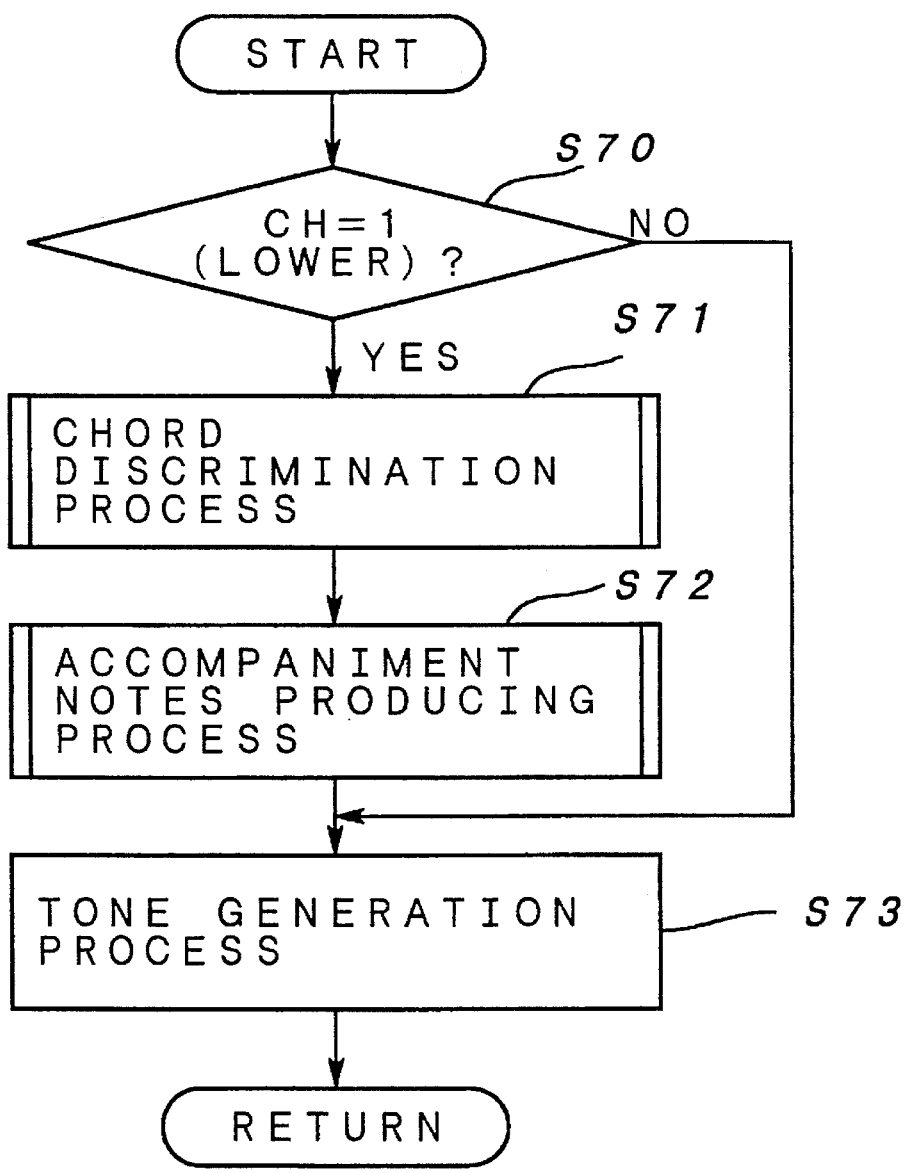
FIG. 7 is a flowchart illustrating a MIDI-IN process according to this embodiment.

(5) MIDI-IN process (FIG. 7)

The MIDI-IN process executed in step S21 of the main routine will be explained in detail with reference to the flow chart of FIG. 7 hereinafter.

The MIDI-IN process routine is called when it is decided in the main routine that an MIDI message is received. In the MIDI-IN process, first, one MIDI message is taken out of the receiving buffer, and it is checked whether or not the MIDI channel number included therein is "1", i.e., whether or not the MIDI message correspond to a lower key (step S70). This checking is performed by checking the channel number in the lower-order 4 bits in the first byte of the MIDI message. If it is decided that the channel number is not "1", the routine jumps to step S73 to execute the general tone generation process based on the MIDI message. On the other hand, if it is decided that the channel number is "1", i.e., that the MIDI message correspond to a lower key, a chord discrimination process is executed (step S71). This chord discrimination process is the same as that explained concerning step S61 of the keyboard control process routine.

Then, an accompaniment notes producing process is executed (step S72). This accompaniment notes producing process is the same as that explained concerning step S62 of the keyboard control process routine. Then, a tone generation process is executed (step 73). This tone generation process is the same as that explained concerning step S64 of the keyboard control process routine. This embodiment has a constitution in which the skill-level determining process is not executed in the MIDI-IN process routine, while the skill-level determining process may be executed as is done in the above keyboard control process routine.

Figure 8:
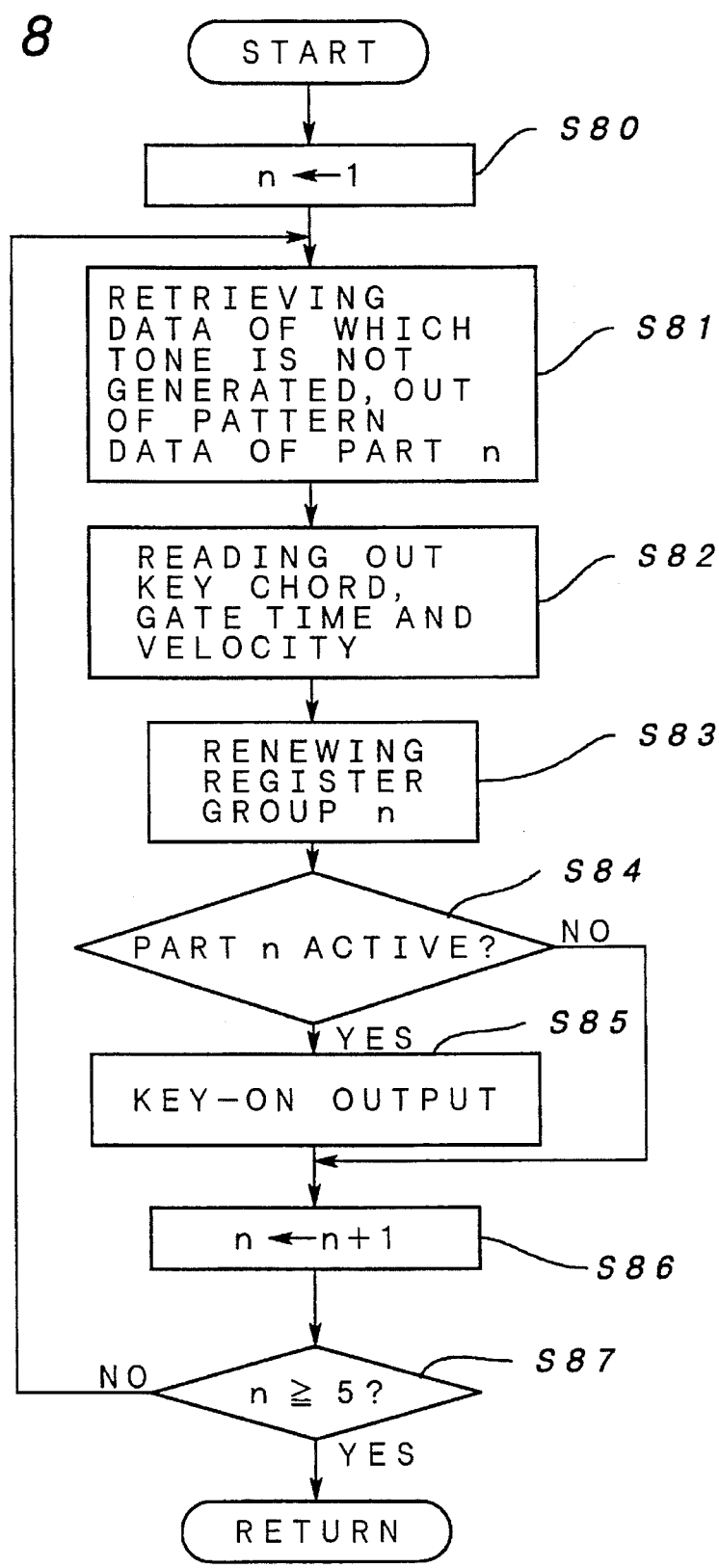
FIG. 8 is a flowchart illustrating a process of reading parts 1 to 4 according to this embodiment.

(6) Parts 1–4 reading process (FIG. 8)

The parts 1–4 reading process executed in step S22 of the main routine will be explained with reference to the flow chart of FIG. 8 hereinafter. In the parts 1–4 reading process, a process for reading out the pattern data corresponding to each of parts 1 to 4 is executed.

The parts 1–4 reading process routine is periodically called by the main routine. In the parts 1–4 reading process, first, a variant n is initialized to be "1" (step S80). Then, data of which no tone is generated is retrieved from the pattern data of the part n (step S81). Then, the key code, the gate time and the velocity in the retrieved pattern data are read out (step S82). Then, the register group RG corresponding to the part n is renewed (step S83). That is, the key code, the gate time and the velocity are stored in one block of the register group RG corresponding to the part n.

Then, it is checked whether or not the concerned part n is active, i.e., whether or not any one of the part switches 136 to 139 corresponding to the part n is depressed (step S84). If it is decided that any part switch is depressed, a key-on output is executed (step S85), whereby the tone generation according to the pattern data of the part n is executed. On the other hand, if it is decided that none of the part switches 136 to 139 is depressed, step S85 is skipped. In this case, therefore, only reading out the pattern data of the part n is executed.

Then, the part number n is incremented (step S86), and if the result thereof is not 5 or more, the routine returns to step S81 to execute the parts 1–4 reading process for the subsequent part. If it is 5 or more, it is recognized that the parts 1–4 reading process for all the parts is finished, and the routine returns from the parts 1–4 reading process to the main routine.

Figure 9:
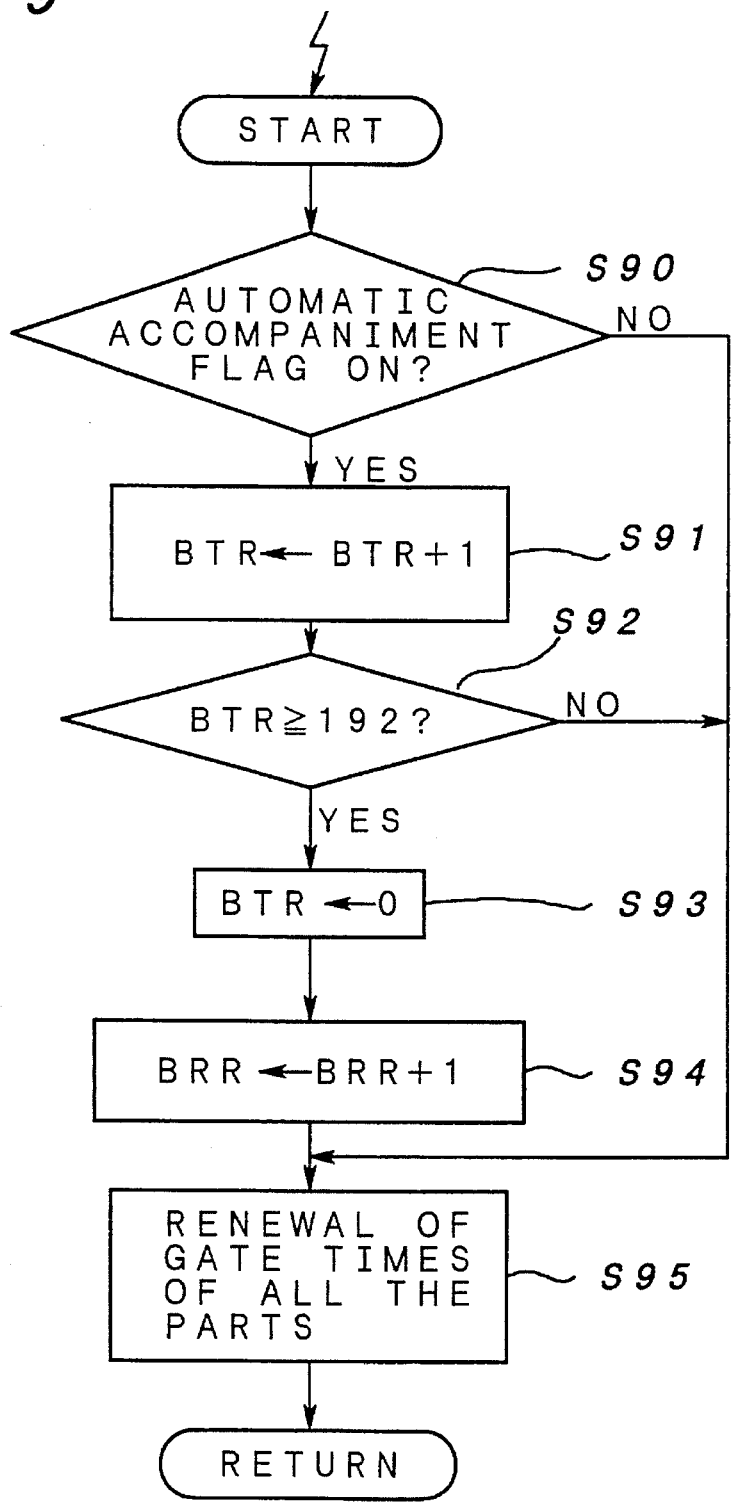
FIG. 9 is a flowchart illustrating a timer interrupt process according to this embodiment.

(7) Timer interrupt process (FIG. 9)

The timer interrupt process routine will be explained with reference to the flow chart of FIG. 9 hereinafter. The timer interrupt process routine is started by supplying an input terminal INT2" of the CPU 10 with an interrupt signal from the timer 17. Therefore, the timer interrupt process routine is started at a time interval corresponding to a 1 step time of tempo set at this point of time.

In the timer interrupt process, it is checked whether or not the automatic accompaniment flag is on, i.e., whether or not the automatic accompaniment is being performed (step S90). If it is decided that the automatic accompaniment flag is on, the content of the beat register BTR is incremented (step S91), and it is checked whether or not the content thereof is "192" (step S92). If it is decided that the content is "192", the beat register BTR is cleared to zero (step S93), and the bar register BRR is incremented (step S94). If it is decided in the above step S92 that the content is less than "192", the processes in steps S93 and S94 are skipped.

Then, the decrement of the gate times of all the parts is executed (step S95). That is, the remaining gate times which are other than "0", included in the register groups RG of all the parts, are decremented. If any remaining gate time which is newly zero as a result of the decrement is present, a key-off output is executed for the key code corresponding to the remaining gate time having zero, to stop the tone generation.

If it is decided in the above step S90 that the automatic accompaniment flag is not on, it is recognized that the automatic accompaniment is not being performed, and only the decrement of gate times of all the parts is executed. Then, the routine returns from the timer interrupt process routine to a site where the interruption occurred.

As explained above, the preferred embodiment has a constitution in which the chord is discriminated in the chord discrimination process, and then the chord information generating process (step S112) is executed on the basis of the discriminated chord in the accompaniment notes producing process. Alternatively, the chord discrimination process may be executed just before the chord information generating process (step S112).

That is, in the keyboard control process shown in FIG. 6, first, it is checked whether or not the key having the event is a lower key (step S60). If it is decided that event is that of a lower key, the accompaniment notes producing process is executed (step S62). In this accompaniment notes producing process routine (step S62), it is decided of TYPE flag is "0" (step S110) and the number of keys depressed in the lower keyboard is "2" or less (step S111), then the chord discrimination process routine as described in the step S61 is performed. Then, the chord information is generated (step S112) and the chord information is sent to the tone generator 15 (step S113).

In this case, the chord discrimination process is executed only when the chord is required, and it is not executed when no chord is required (in the sequence executing step S114), so that the process efficiency can be improved.

As explained above, according to the present invention, there is provided a chord information generating apparatus and a chord information generating method, for automatically determining the skill level of a player without indicating that the player is a beginner or a skilled one and for generating the chord information depending upon the performance skill of the player.

What is claimed is:

1. A chord information generating apparatus comprising
key-depression detecting means for detecting a key-depression state,
data producing means for producing data representing a skilled person or data representing a beginner in accordance with the key-depression state detected by the key-depression detecting means,
data accumulating means for sequentially accumulating the data representing a skilled person and the data representing a beginner produced by the data producing means,
skill-level determining means for determining the skill level of a player on the basis of a plurality of pieces of the data representing a skilled person and the data representing a beginner accumulated in the data accumulating means, and
chord information generating means for generating chord information in accordance with the result from the skill-level determining means and on the basis of the key-depression state detected by the key-depression detecting means.

2. The apparatus according to claim 1, wherein
when said key-depression detecting means detects depression of one or two keys, said data producing means produces the data representing a beginner, and when said key-depression detecting means detects depression of at least three keys, said data producing means checks whether or not a chord is formed, and then, produces the data representing a skilled person when it is determined that a chord is formed, or the data representing a beginner when it is determined that a chord is not formed.

3. The apparatus according to claim 1, wherein said skill-level determining means determines that the player is a skilled one when a ratio of the number of pieces of the data representing a skilled person accumulated in the data accumulating means, to the number of all pieces of the data accumulated in the data accumulating means, is equal to or greater than a predetermined value, or that the player is a beginner when the above ratio is less than the value.

4. The apparatus according to claim 3, wherein said chord information generating means comprises chord discriminating means and accompaniment notes producing means,
the chord discriminating means discriminates a chord consisting of a chord type and a chord root, on the basis of the key-depression state detected by said key-depression detecting means,
the accompaniment notes producing means produces the chord information for generating at least three chord tones on the basis of the chord discriminated by the chord discriminating means when said key-depression detecting means detects depression of one or two keys and when it is determined by said skill-level determining means that the player is a beginner, and the accompaniment notes producing means produces the chord information for generating tones corresponding to a key-depression state in a case other than the above.

5. The apparatus according to claim 4, wherein the apparatus further has a chord type designating device for designating a chord type, and
when said key-depression detecting means detects depression of one key and when it is determined by said skill-level determining means that the player is a beginner, said chord discriminating means discriminates a chord consisting of a chord root corresponding to the key-depression state and a chord type designated by the chord type designating device, or discriminates a chord consisting of a chord root and a chord type on the basis of the key-depression state in a case other than the above.

6. The apparatus according to claim 5, wherein said chord type designating device comprises a first operating device and a second operating device, and miner is selected as a chord type when the first operating device is operated, seventh is selected as a chord type when the second operating device is operated, or major is selected as a chord when none of the first and second operating devices are operated.

7. The apparatus according to claim 1, wherein said key-depression detecting means detects a key-depression state in a specific key area.

8. The apparatus according to claim 1, wherein said data accumulating means holds an accumulated content after electric power is cut off.

9. The apparatus according to claim 8, wherein the apparatus further has clear means for forcibly clearing the accumulated content of the data accumulating means when electric power is turned on.

10. A chord information generating method, comprising the steps of
(A) detecting a key-depression state,
(B) producing data representing a skilled person or data representing a beginner in accordance with a result of the detection,
(C) sequentially accumulating the produced data,
(D) determining that a player is a skilled one when a ratio of the number of pieces of the accumulated data representing a skilled person to the number of all pieces of the accumulated data is equal to or greater than a predetermined value, or that the player is a beginner when the ratio is less than the predetermined value, and (E) generating chord information in accordance with a result of the determination and on the basis of the key-depression state.

11. The method according to claim 10, wherein, when the depression of one or two keys is detect, the data representing a beginner is produced in step (B), and when the depression of at least three keys is detected, whether or not a chord is formed is checked in said step (B), and then, the data representing a skilled person is produced when it is determined that a chord is formed, or the data representing a beginner is produced when it is determined that a chord is not formed.

12. The method according to claim 10, wherein, said step (E) includes a step of discriminating a chord on the basis of the key-depression state, and in said step (E), the chord is discriminated on the basis of the key-depression state, and then, the chord information for generating at least three chord tones is generated on the basis of the discriminated chord when depression of one or two keys is detected and when it is determined that the player is a beginner, or the chord information for generating tones corresponding to the key-depression state is generated in a case other than the above.

13. The method according to claim 12, wherein said step of discriminating a chord in said step (E) includes a step of designating a chord type, and in the step of discriminating a chord, when depression of one key is detected and when it is determined that the player is a beginner, a chord consisting of a chord root corresponding to the key-depression state and the designated chord type is discriminated, and in a case other than the above, a chord consisting of a chord root and a chord type is discriminated on the basis of the key-depression state.

14. The method according to claim 10, wherein, said step (E) includes a step of discriminating a chord on the basis of the key-depression state, and in said step (E), when depression of one or two keys is detected and when it is determined that the player is a beginner, a chord is discriminated on the basis of the key-depression state and then the chord information for generating at least three chord tones is generated on the basis of the discriminated chord, and in a case other than above, the chord information for generating tones corresponding to the key-depression state is generated.

15. The method according to claim 14, wherein said step of discriminating a chord in said step (E) includes a step of designating a chord type, and in the step of discriminating a chord, when depression of one key is detected and when it is determined that the player is a beginner, a chord consisting of a chord root corresponding to the key-depression state and the designated chord type is discriminated, and in a case other than the above, a chord consisting of a chord root and a chord type is discriminated on the basis of the key-depression state.

16. The method according to claim 10, wherein the data accumulated in step (C) is held after electric power is cut off.

17. The method according to claim 16, wherein the accumulated data is cleared if an clearing indication is given when electric power is turned on.

* * * * *